USO11427364B2

(12) United States Patent
Chalkley et al.

(10) Patent No.: US 11,427,364 B2
(45) Date of Patent: Aug. 30, 2022

(54) DOSER ASSEMBLIES, APPARATUSES INCLUDING A DOSER ASSEMBLY, AND/OR METHODS OF MAKING THE SAME

(71) Applicant: Altria Client Services LLC, Richmond, VA (US)

(72) Inventors: Jarrod Wayne Chalkley, Mechanicsville, VA (US); Loren Theodore Duvekot, Goochland, VA (US)

(73) Assignee: Altria Client Services LLC, Richmond, VA (US)

( * ) Notice: Subject to any disclaimer, the term of this patent is extended or adjusted under 35 U.S.C. 154(b) by 419 days.

(21) Appl. No.: 16/382,736

(22) Filed: Apr. 12, 2019

(65) Prior Publication Data

US 2020/0354097 A1 Nov. 12, 2020

(51) Int. Cl.
*B65B 37/08* (2006.01)
*B65B 1/10* (2006.01)
(Continued)

(52) U.S. Cl.
CPC .......... *B65B 41/16* (2013.01); *B29C 65/7894* (2013.01); *B29C 66/83413* (2013.01);
(Continued)

(58) Field of Classification Search
CPC ......... B65B 41/16; B65B 57/14; B65B 39/14; B29C 65/7894; B29C 66/83413; B29C 66/8491; B29C 66/8511
(Continued)

(56) References Cited

U.S. PATENT DOCUMENTS 1,524,915 A * 2/1925 Debay ...................... B28B 5/10
425/220
2,737,130 A * 3/1956 Rhodes .................... A21C 3/02
425/367

(Continued)

FOREIGN PATENT DOCUMENTS

DE 19725377 A1 12/1998
EP 0188832 A2 7/1986
(Continued)

OTHER PUBLICATIONS

GD, Horizontal Flat Pouching Machine <https://www.gidi.it/en/solutions/product/sm>, accessed Apr. 11, 2019.
(Continued)

*Primary Examiner* — Robert F Long
*Assistant Examiner* — Xavier A Madison
(74) *Attorney, Agent, or Firm* — Harness, Dickey & Pierce, P.L.C.

(57) ABSTRACT

In an example embodiment, a doser assembly includes a hopper assembly configured to receive plant material, a bracket assembly connected to the hopper assembly, and a roller in a hopper opening defined by the hopper assembly extending through the hopper assembly. An interior surface of the hopper assembly may define the hopper opening. The bracket assembly may include a shaft extending across a portion of the hopper opening. The roller may be in the portion of the hopper opening of the hopper assembly and may extend between a first part and a second part of the interior surface of the hopper assembly. The roller may be connected to the shaft and may be configured to rotate with rotation of the shaft.

22 Claims, 31 Drawing Sheets

(51) Int. Cl.
*B65B 41/16* (2006.01)
*B29C 65/78* (2006.01)
*B29C 65/00* (2006.01)
*B65B 39/14* (2006.01)

(52) U.S. Cl.
CPC ...... *B29C 66/8491* (2013.01); *B29C 66/8511* (2013.01); *B65B 39/14* (2013.01)

(58) Field of Classification Search
USPC .................................................. 53/450, 553
See application file for complete search history.

(56) References Cited

U.S. PATENT DOCUMENTS

| | | | | |
|---|---|---|---|---|
| 3,446,404 | A * | 5/1969 | Mehta | B65G 65/4881 222/225 |
| 4,400,851 | A * | 8/1983 | Hudson | D01B 1/08 19/55 R |
| 4,870,808 | A * | 10/1989 | Romagnoli | B65B 1/366 53/529 |
| 6,591,584 | B1 * | 7/2003 | Saito | B65B 1/363 53/450 |
| 7,661,248 | B2 * | 2/2010 | Conti | B65B 29/025 53/529 |
| 10,028,521 | B2 | 7/2018 | Carroll et al. | |
| 10,894,619 | B2 * | 1/2021 | Rivola | B65B 29/028 |
| 2003/0070399 | A1 * | 4/2003 | Wingert | B30B 9/301 53/459 |
| 2008/0209858 | A1 * | 9/2008 | Trebbi | A61J 3/074 53/282 |
| 2013/0202765 | A1 * | 8/2013 | Nagayama | A21C 11/24 426/557 |
| 2014/0190638 | A1 | 7/2014 | Hull | |
| 2014/0261473 | A1 | 9/2014 | Carroll et al. | |
| 2019/0216099 | A1 * | 7/2019 | Li | A21C 11/24 |

FOREIGN PATENT DOCUMENTS

| | | |
|---|---|---|
| EP | 2129581 A2 | 12/2009 |
| FR | 2149657 A5 | 3/1973 |
| WO | WO-2008/114122 A2 | 9/2008 |
| WO | WO-2017060399 A1 | 4/2017 |
| WO | WO-2017093486 A1 | 6/2017 |

OTHER PUBLICATIONS

U.S. Appl. No. 16/382,820, filed Apr. 12, 2019.
Extended European Search Report dated Aug. 3, 2020, issued in corresponding European Patent Application No. 20167349.8.
European Office Action dated Nov. 8, 2021, issued in corresponding European Patent Application No. 20 167 349.8.

* cited by examiner

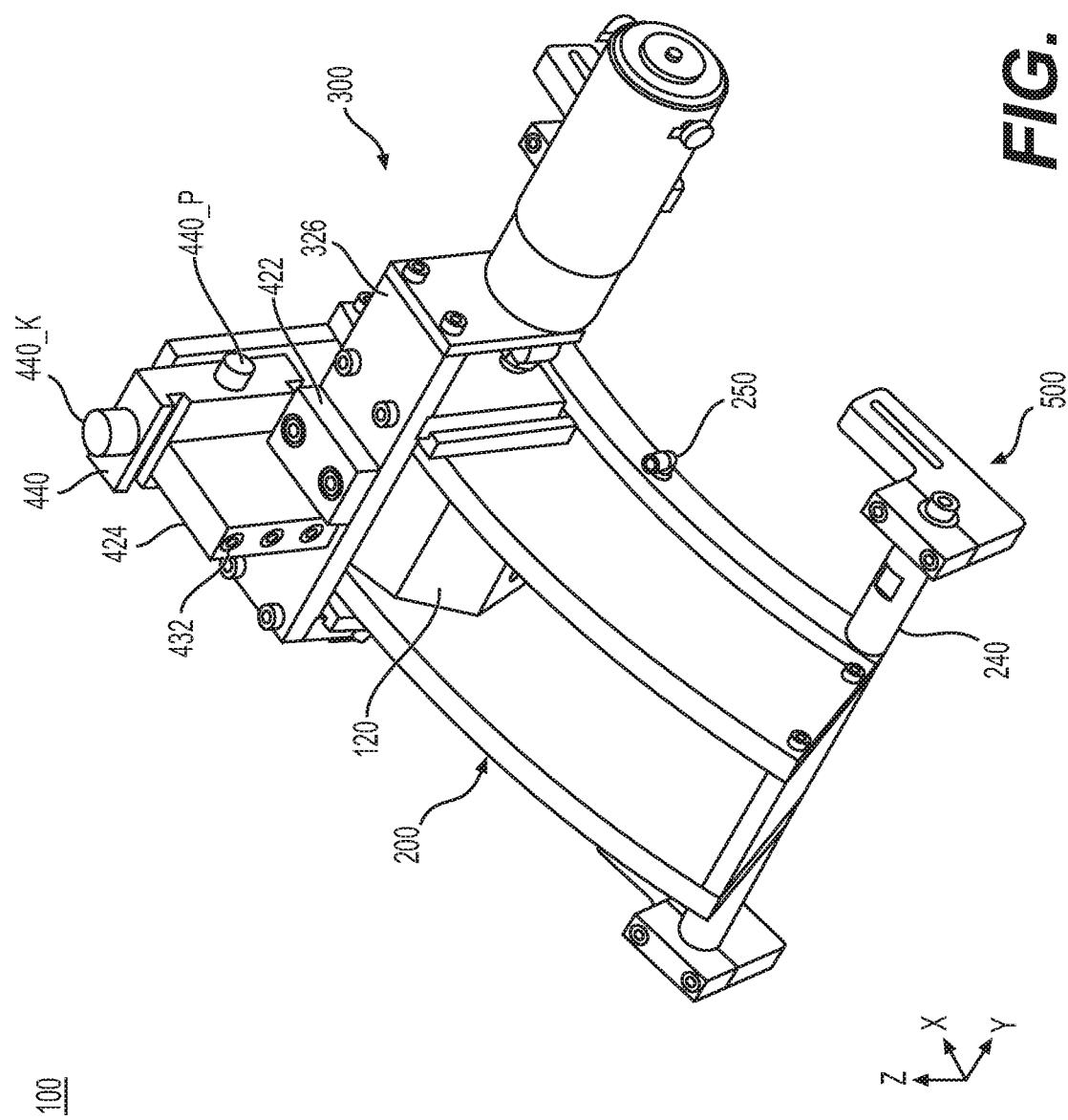

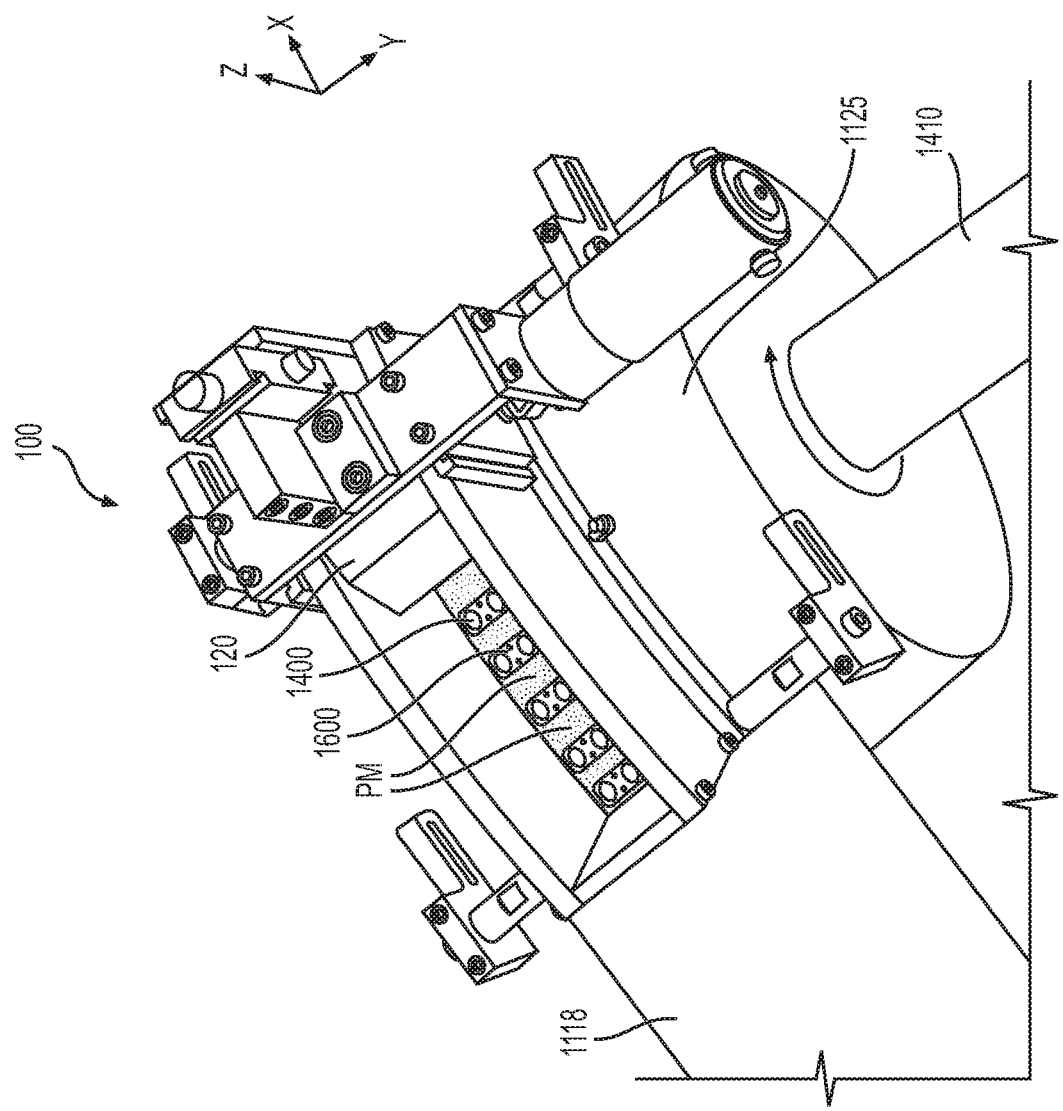

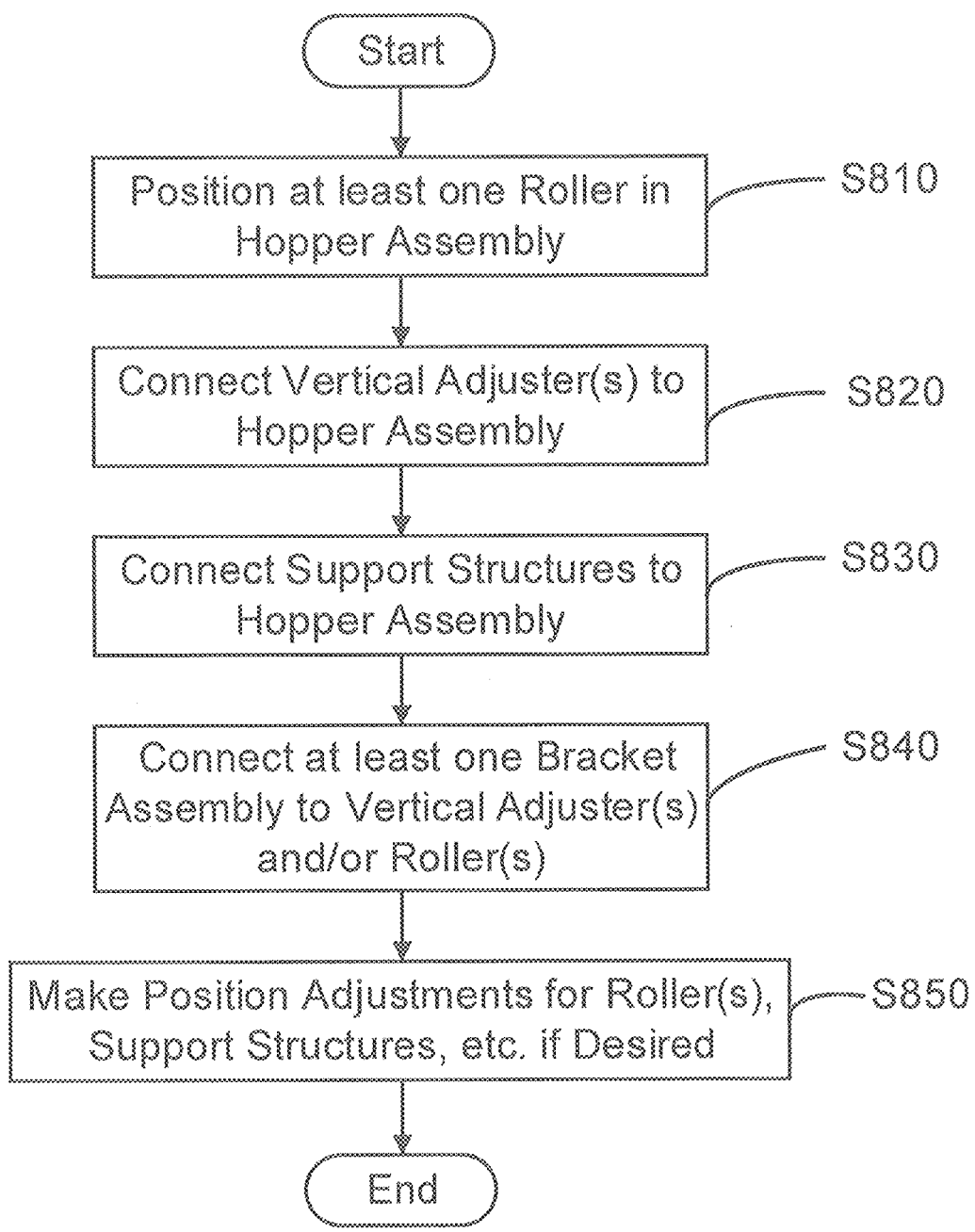

DOSER ASSEMBLIES, APPARATUSES INCLUDING A DOSER ASSEMBLY, AND/OR METHODS OF MAKING THE SAME

BACKGROUND

Field

The present disclosure relates to doser assemblies, apparatuses including a doser assembly, and/or methods of making the doser assemblies and/or apparatuses.

Description of Related Art

In manufacturing plant material products (e.g., oral products), machines may be used prepare pouches containing plant material products. In some cases, the pouches may be filled with plant material.

SUMMARY

Example embodiments relate to a doser assembly, a doser apparatus including the doser assembly, and/or a method of making the doser assembly.

In an example embodiment, a doser assembly may include a hopper assembly configured to receive plant material, a bracket assembly connected to the hopper assembly, and a roller. An interior surface of the hopper assembly may define a hopper opening that extends through the hopper assembly. The bracket assembly may include a shaft that extends across a portion of the hopper opening. The roller may be in a portion of the hopper opening of the hopper assembly. The roller may extend in a direction between a first part of the interior surface of the hopper assembly and a second part of the interior surface of the hopper assembly. The roller may be connected to the shaft of the bracket assembly and may be configured to rotate with a rotation of the shaft of the bracket assembly.

In some embodiments, the doser assembly may further include a vertical adjuster connected to the bracket assembly. An upper surface of the hopper assembly may define a first hopper groove and a second hopper groove that each have a width in a first direction, are spaced apart from each other in a second direction, and each descend in a third direction from the upper surface of the hopper assembly. The shaft may be connected to the roller and may extend in the second direction through the first hopper groove, the roller, and the second hopper groove. The vertical adjuster may be configured to adjust of a position of the roller in the third direction based on adjusting the position of the shaft in the third direction. The first direction, second direction, and third direction may cross each other.

In some embodiments, the roller may have a prism-like shape. The roller may include a first roller base and a second roller base connected to each other with a plurality of lateral faces therebetween. A shape of the first roller base may be the same as a shape of the second roller base.

In some embodiments, the shape of the first roller base and the shape of the second roller base may be regular polygons that include at least N sides. N may be an integer greater than or equal to four and less than or equal to twelve. The roller may have a shape like a regular polygonal prism including at least N lateral faces. A length of the N lateral faces may be a length of the roller, and a width of the N lateral faces may be a width of an edge of the first roller base and a width of an edge of the second roller base.

In some embodiments, the first roller base may include a first recess that defines a first roller protrusion that extends from a center of the first roller base and may be surrounded by the first recess. The second roller base may include a second recess that defines a second roller protrusion that extends from a center of the second roller base and may be surrounded by the second recess. The roller may define a roller opening that extends from the first roller protrusion through the roller to the second roller protrusion. The shaft of the bracket assembly may extend through the roller opening. The shaft may be connected to roller such that the roller may be configured to rotate with the rotation of the shaft.

In some embodiments, a lower surface of a first side of the hopper assembly may be concave, and a lower surface of a second side of the hopper assembly may be concave. The first side of the hopper assembly and the second side of the hopper assembly may each extend in a first direction and may be spaced apart from each other in a second direction crossing the first direction. An inner surface of the first side of the hopper assembly may include the first part of the interior surface of the hopper assembly, and an inner surface of the second side of the hopper assembly may include the second part of the interior surface of the hopper assembly.

In some embodiments, the hopper assembly may include a first hopper wall and a second hopper wall that face each other and may be spaced apart from each other. An inner surface of the first hopper wall may include the first part of the interior surface of the hopper assembly, and an inner surface of the second hopper wall may include the second part of the interior surface of the hopper assembly.

In some embodiments, a lower surface of the first hopper wall may be concave, and a lower surface of the second hopper wall may be concave. The lower surface of the first hopper wall may be level with the lower surface of the second hopper wall and may be aligned with the lower surface of the second hopper wall.

In some embodiments, the first hopper wall may include a first hopper groove that descends from an upper surface of the first hopper wall. The second hopper wall may include a second hopper groove that descends from an upper surface of the second hopper wall. The second hopper groove may be positioned across from the first hopper groove. A depth of the first hopper groove may be less than a distance between the lower surface of the first hopper wall and the upper surface of the first hopper wall at a location adjacent to the first hopper groove, and a depth of the second hopper groove may be less than a distance between the lower surface of the second hopper wall and the upper surface of the second hopper wall at a location adjacent to the second hopper groove.

In some embodiments, the roller may be between the first hopper groove and the second hopper groove. The shaft may extend through the first hopper groove and the second hopper groove. The depth of the first hopper groove may be equal to the depth of the second hopper groove. A width of the first hopper groove may be equal to a width of the second hopper groove, and the width of the first hopper groove and the width of the second hopper groove may be greater than or equal to a width of the shaft.

In some embodiments, the doser assembly may further include a third hopper wall and a fourth hopper wall that face each other. The third hopper wall and the fourth hopper wall may be spaced apart from each other. The third hopper wall may be connected to the first hopper wall and the second hopper wall at a first end region of the hopper assembly. The fourth hopper wall may be connected to the first hopper wall and the second hopper wall at a second end region of the hopper assembly.

In some embodiments, the interior surface of the hopper assembly that defines the hopper opening may include at least a portion of the inner surface of the first hopper wall, at least a portion of the inner surface of the second hopper wall, at least a portion of an inner surface of the third hopper wall, and at least a portion of an inner surface of the fourth hopper wall. The roller may be adjacent to the inner surface of the fourth hopper wall in the hopper opening.

In some embodiments, the bracket assembly further may include a motor connected to one end of the shaft, and the motor may be configured to rotate the shaft.

In some embodiments, the doser assembly may further include a first conduit line and optionally a second conduit line. The first conduit line may be configured to provide vacuum, gases, or both vacuum and gases into the hopper assembly through a first conduit opening in the hopper assembly. The second conduit line may be configured to provide vacuum, gases, or both vacuum and gases into the hopper assembly through a second conduit opening in the hopper assembly.

In some embodiments, the doser assembly may further include a vertical adjuster connected to the bracket assembly. The roller may have a width in a first direction. A length of the roller may extend in a second direction that crosses the first direction. The vertical adjuster may be configured to adjust a position of at least a portion of the bracket assembly in a third direction that crosses the first direction and the second direction.

In some embodiments, the vertical adjuster may include a knob. An upper surface of the hopper assembly may define a first hopper groove and a second hopper groove that may be spaced apart from each other in the second direction. The shaft may extend in the second direction through the first hopper groove and the second hopper groove. The vertical adjuster may be configured to adjust the position of the shaft of the bracket assembly in the third direction in response to the knob being rotated.

In some embodiments, the bracket assembly may include a horizontal piece. The horizontal piece of the bracket assembly may extend in the second direction over the roller, the portion of the hopper opening, and a region of the hopper assembly that includes the first part of the interior surface of the hopper assembly and the second part of the interior surface of the hopper assembly. A length of the horizontal piece in the second direction may be greater than a width of the hopper assembly in the second direction.

In some embodiments, the bracket assembly may further include a first bracket wall, a second bracket wall, a third bracket wall, a first spacer structure, and a second spacer structure. The first bracket wall, the second bracket wall, and the third bracket wall may be spaced apart from each other in the second direction and may be connected to the horizontal piece. The shaft may extend in the second direction through corresponding holes in the first bracket wall the second bracket wall and the third bracket wall. The first spacer structure may be wedged between the second bracket wall and an outer surface of a first side of the hopper assembly. The shaft may extend through a first shaft opening defined in the first spacer structure and a second shaft opening defined in the second spacer structure. The second spacer structure may be wedged between the third bracket wall and a second side of the hopper assembly. The vertical adjuster may be configured to adjust a position of the horizontal piece, the first bracket wall, the second bracket wall, and the third bracket wall in the third direction in response to the knob being rotated. The vertical adjuster may be configured to adjust the position of the second bracket wall and third bracket wall in the third direction relative to the first spacer structure and the second spacer structure in the third direction in response to the knob being rotated.

In some embodiments, the hopper assembly may include a first hopper wall and second hopper wall that extend in the first direction and may be spaced apart from each other in the second direction. A lower surface of the roller may be higher in the third direction than a lower surface of the first hopper wall and a lower surface of the second hopper wall by a roller offset distance. The roller offset distance may be greater than 0 inches and less than ⅛ of an inch. The shaft may extend through a center of the roller in the second direction. The shaft may be connected to the roller. The vertical adjuster may be configured to adjust the roller offset distance in the third direction based on adjusting the position of the shaft in the third direction.

In an example embodiment, a method of manufacturing a doser assembly may include positioning a roller in a hopper assembly configured to receive plant material and connecting a bracket assembly to the hopper assembly. An interior surface of the hopper assembly may define a hopper opening that extends through the hopper assembly. The roller may include a roller opening that extends through a length of the roller. The hopper assembly may define a first hopper groove and a second hopper groove that descend from an upper surface of the hopper assembly may be spaced apart from each other across a portion of the hopper opening. The positioning the roller in the hopper assembly may include arranging the roller in the portion of the hopper opening so the roller extends in a direction between a first part of the interior surface of the hopper assembly and a second part of the interior surface of the hopper assembly. The bracket assembly may include a shaft. The connecting the bracket assembly to the hopper assembly may include inserting the shaft through the first hopper groove, roller opening, and second hopper groove. The connecting the bracket assembly to the hopper assembly may include connecting the shaft to the roller such that the roller may be configured with rotation of the shaft.

In some example embodiments, the method may further include connecting a vertical adjuster to the hopper assembly and bracket assembly. The roller may have a width in a first direction. A length of the roller may extend in a second direction that crosses the first direction. A length of the shaft may extend in the second direction. The vertical adjuster may be configured to adjust a position of the shaft in a third direction. The third direction may cross the first direction and the second direction. The vertical adjuster may be configured to adjust a position of the roller in the third direction based on adjusting the position of the shaft in the third direction.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIGS. 1A and 1B are perspective views of a doser assembly according to an example embodiment;

FIGS. 7A and 7C are a side view and a perspective view of portions of an apparatus including a doser assembly on a conveyor system according to an example embodiment;

FIG. 8 is a flow chart illustrating operations in a method of manufacturing a doser assembly according to an example embodiment.

DETAILED DESCRIPTION

Figure 1A:
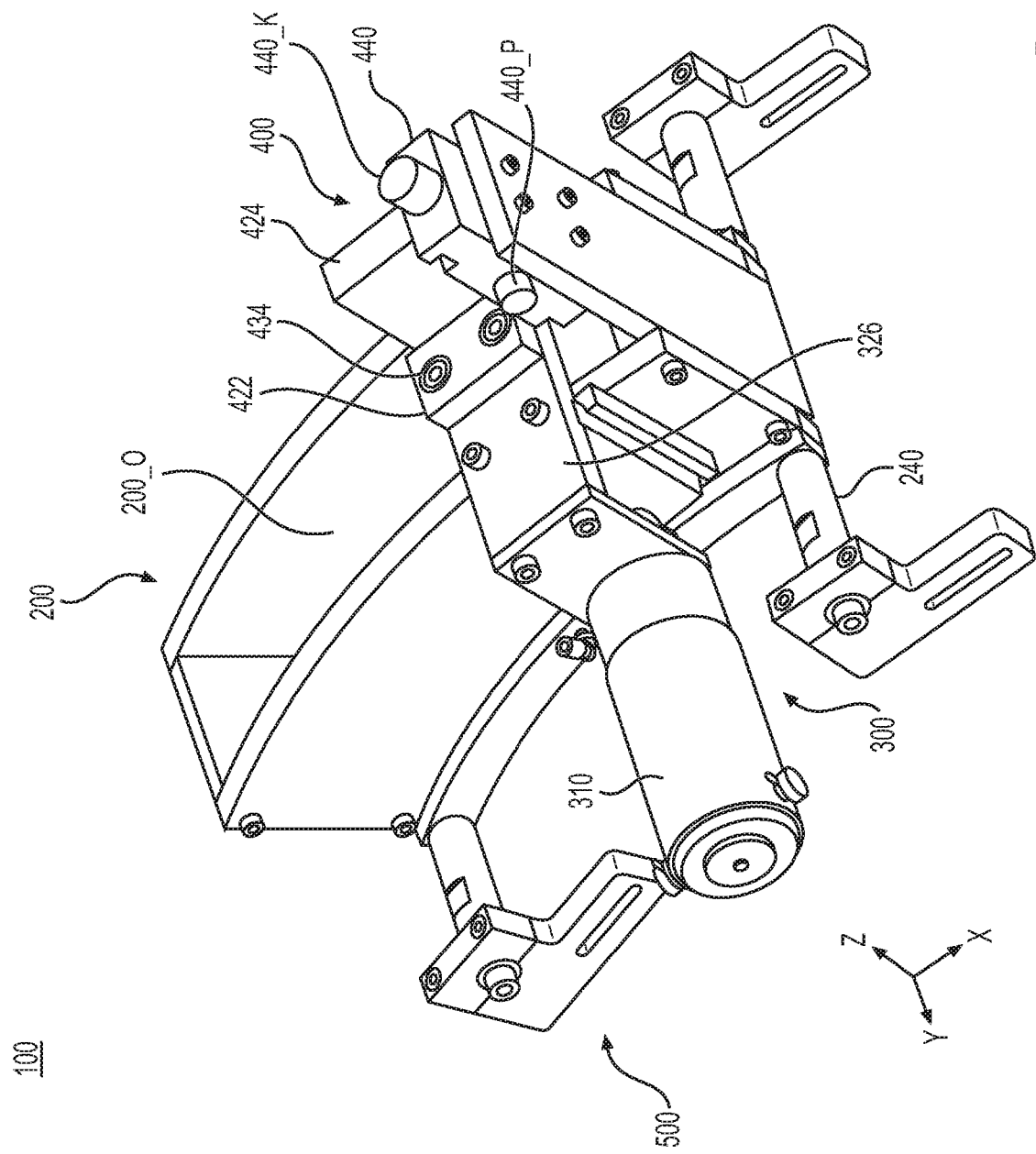

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations and variations in shapes.

When the terms "about" or "substantially" are used in this specification in connection with a numerical value, it is intended that the associated numerical value include a tolerance of ±10% around the stated numerical value unless the context indicates otherwise.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In the drawings, a X-Y-Z coordinate axis may be used to describe some features. The X direction may be referred to as a first direction. The Y direction may be referred to as a second direction. The Z direction may be referred to as a third direction. As shown in FIGS. 1A and 1B, for example, the X, Y, and Z directions may cross each other and may be orthogonal to each other.

FIGS. 1A and 1B are perspective views of a doser assembly according to an example embodiment. FIGS. 2A to 2F illustrate a first side view (FIG. 2A), a second side view (FIG. 2B), an overhead view (FIG. 2C), an underside view (FIG. 2D), a front-facing view (FIG. 2E), and a rear-facing view (FIG. 2F) of a doser assembly according to an example embodiment.

Referring to FIGS. 1A and 1B, in an example embodiment, a doser assembly 100 may include at least a roller 120, a hopper assembly 200, a bracket assembly 300, coupling pieces 400, a vertical adjuster 440, and support structures 500.

An interior surface of the hopper assembly 200 may define a hopper opening 200_O that extends through the hopper assembly 200. The hopper assembly 200 may be configured to receive plant material (e.g., tobacco) into the hopper opening 200_O. The plant material may be provided into the hopper opening 200_O from above the hopper assembly 200, and may be provided manually and/or using machinery. In some embodiments, a conveyor belt (not shown in FIGS. 1A and 1B) above the doser assembly 100 may provide the plant material into the hopper opening 200_O of the doser assembly 100, but other means may be used to provide the plant material to the doser assembly 100. Additional details for an example of the hopper assembly 200 are described below with reference to FIGS. 3B and 3C.

Figure 2A:
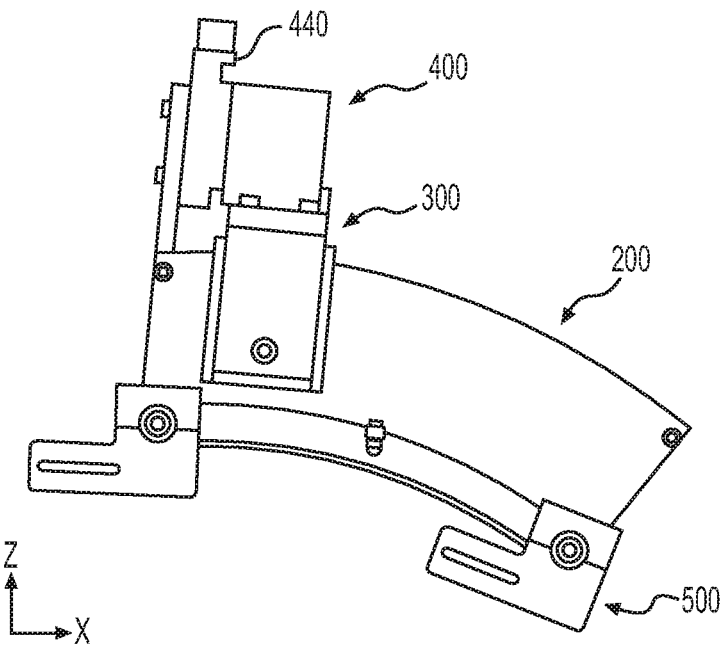
FIGS. 2A to 2F illustrate a first side view, a second side view, an overhead view, an underside view, a front-facing view, and a rear-facing view of a doser assembly according to an example embodiment.
Figure 2B:
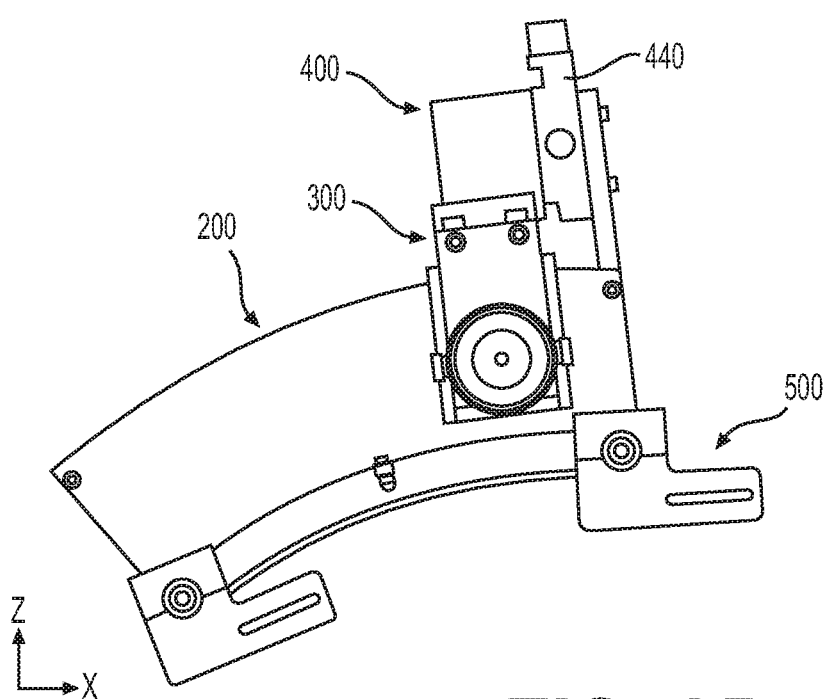
Figure 2C:
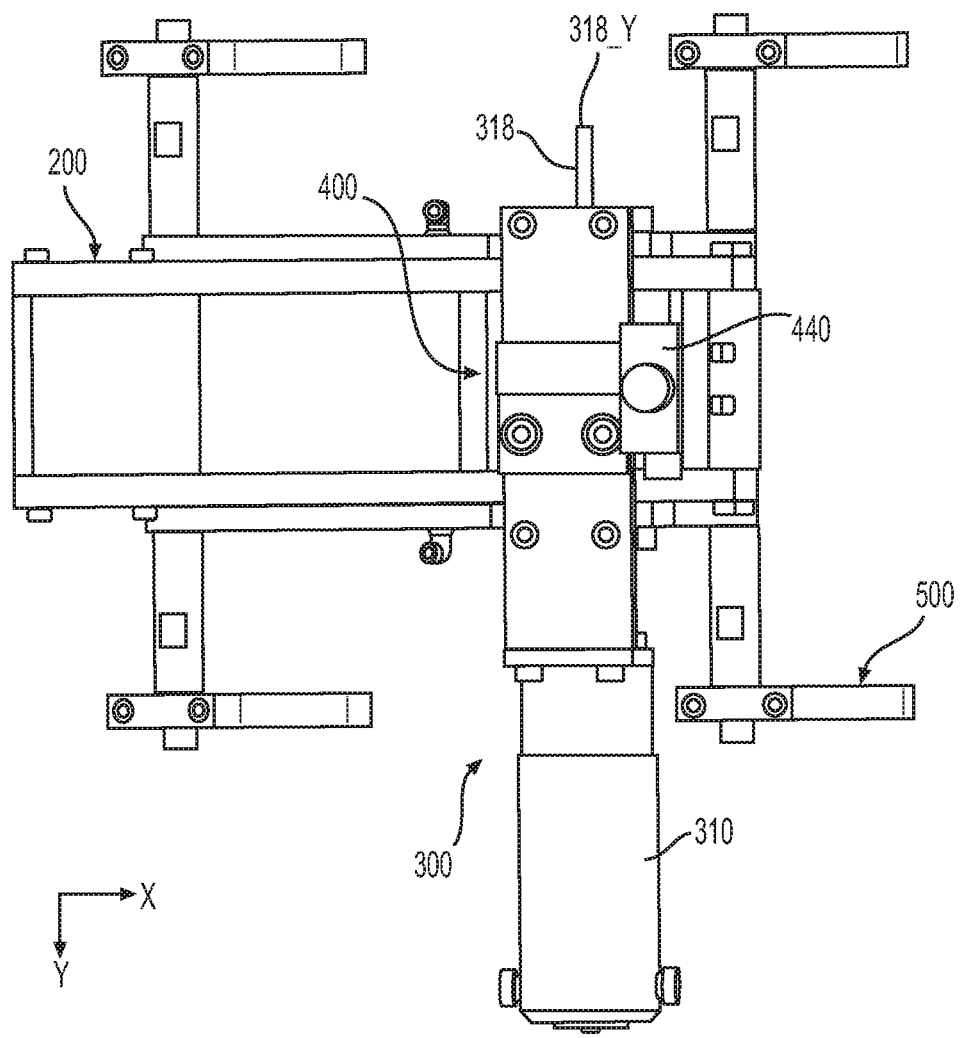
Figure 2D:
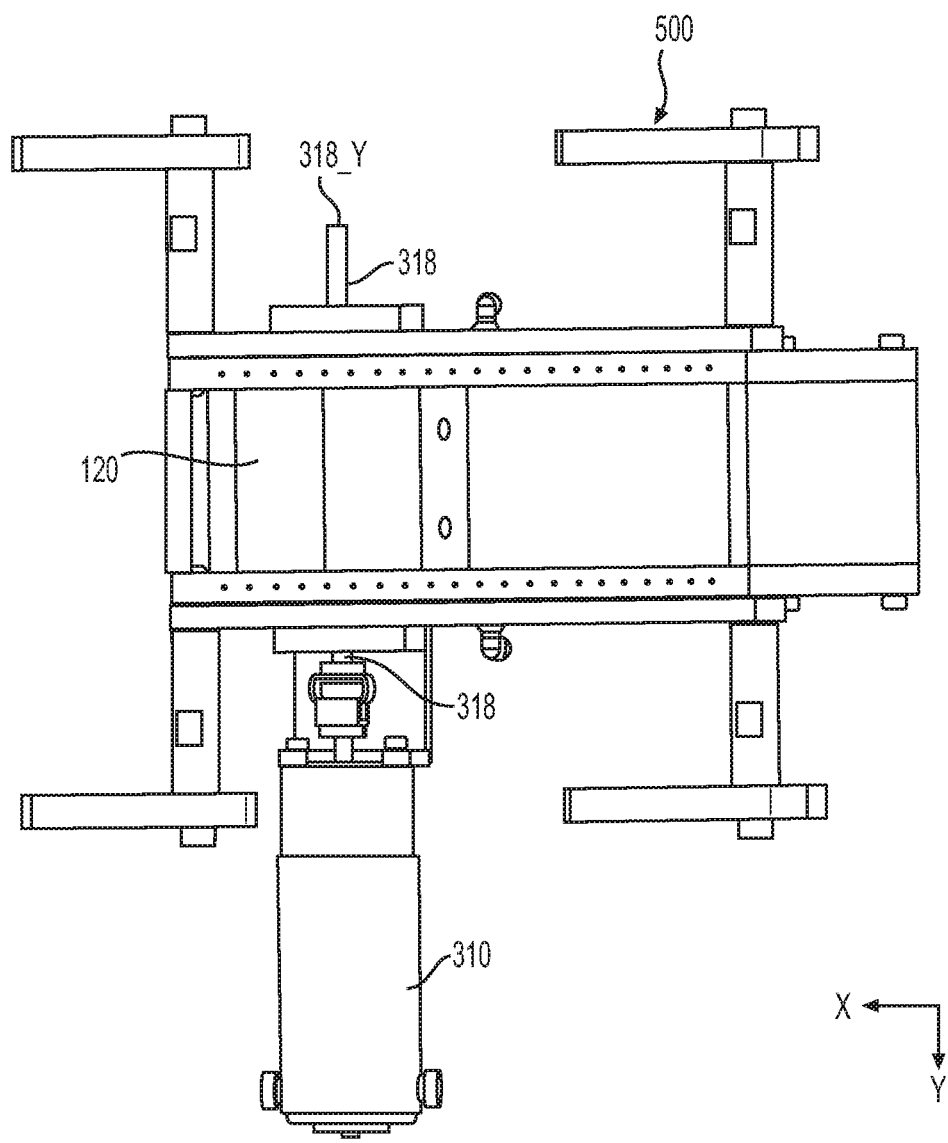
Figure 2E:
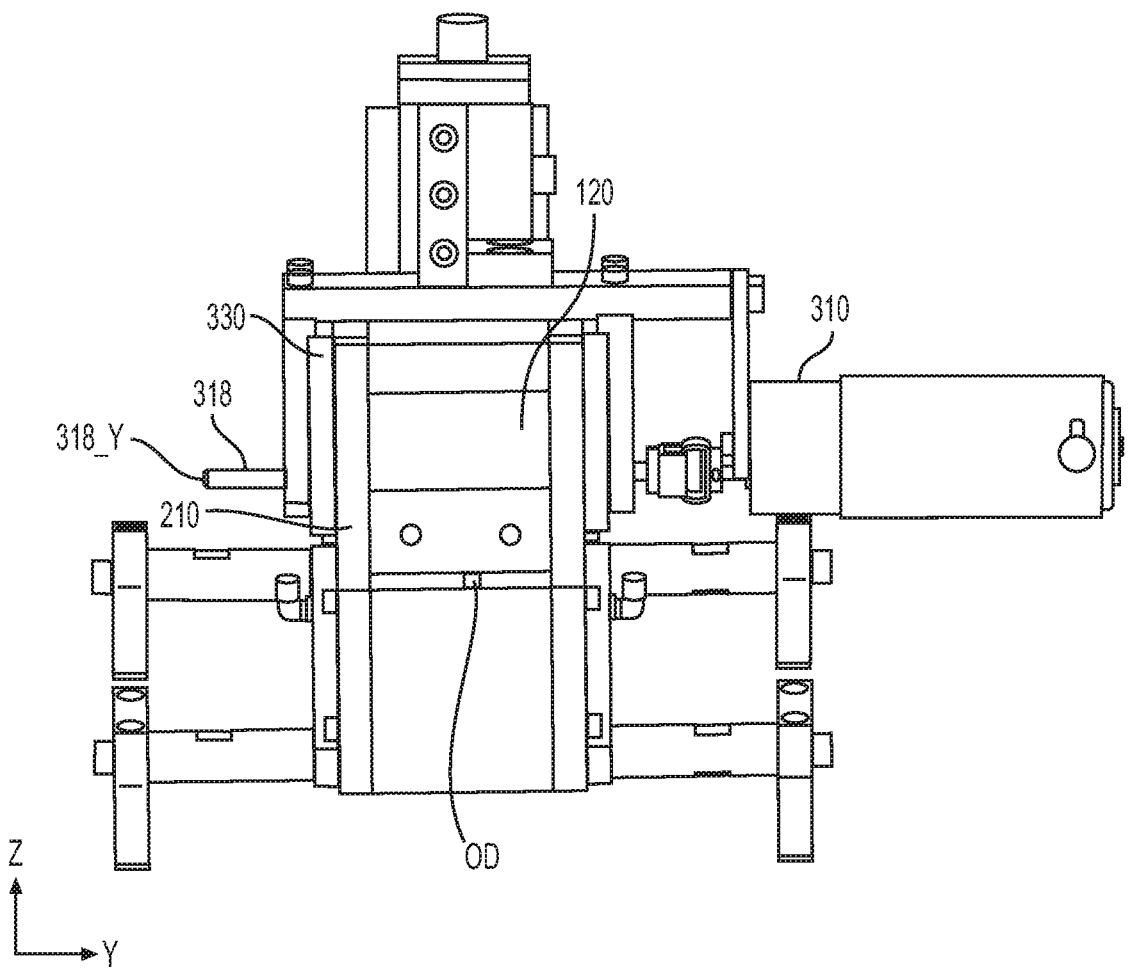
Figure 2F:
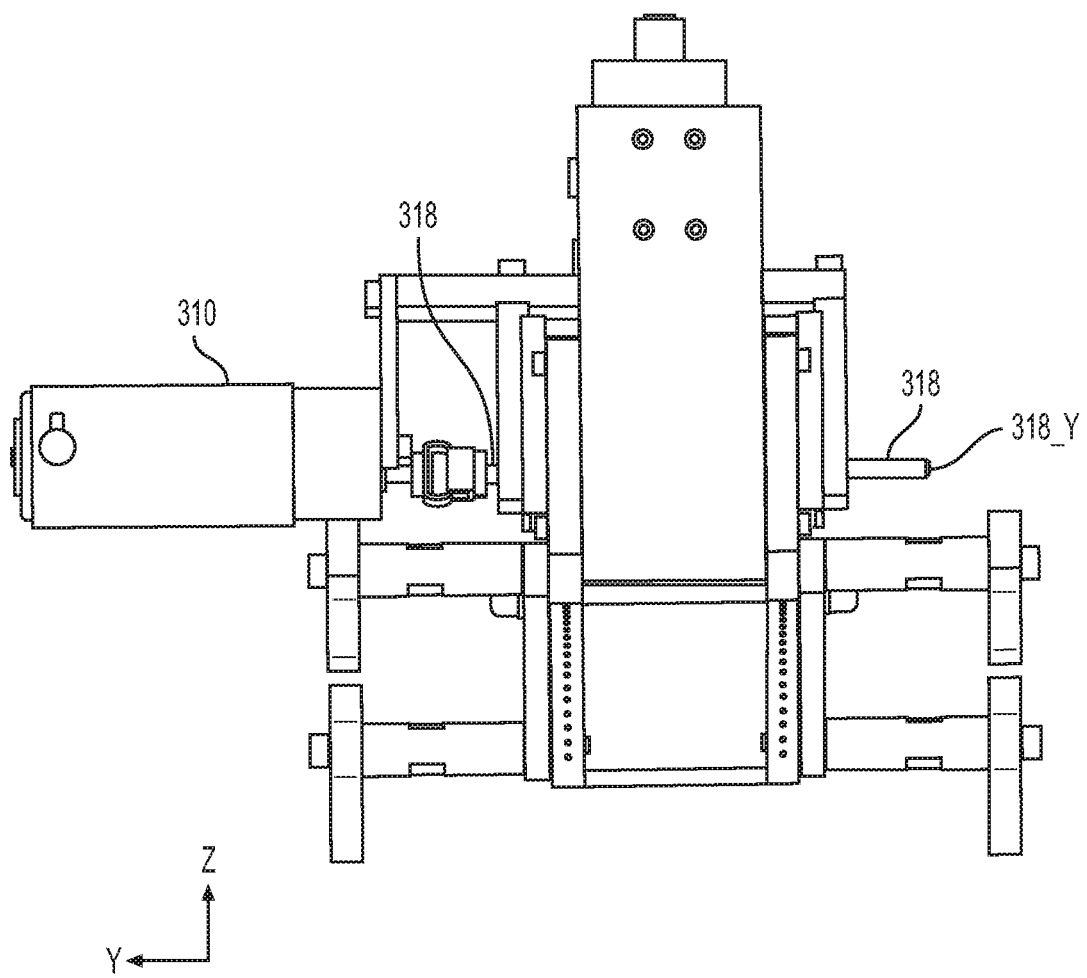

The bracket assembly 300 may be connected to the hopper assembly 200. For example, as shown in FIGS. 2D, 2E, and 2F, the bracket assembly 300 may include a shaft 318 that extends across a portion of the hopper opening 200_O. One end of the shaft 318 may be connected to a motor 310 (e.g., electric motor, fuel-powered motor, etc.). The shaft 318 may extend from the motor 310 through the hopper assembly 200 and another end of the shaft 318 may extend from the hopper assembly 200 outward. The motor 310 may be configured to rotate the shaft 318 around the axis 318_y that extends through the shaft 318.

As shown in FIG. 1B, the roller 120 may be positioned in a portion of the hopper opening 200_O. The roller 120 may also be referred to as a doffer. As shown in FIG. 3B, the roller 120 may extend in a direction between a first part 200_P1 of the interior surface of the hopper assembly 200 and a second part 200_P2 of the interior surface of the hopper assembly. As shown in FIGS. 2C and 2D, the roller 120 may be connected to the shaft 318 of the bracket assembly and may be configured to rotate with the rotation of the shaft 318. Also, as shown in FIGS. 2C and 2D, the shaft 318 may include an axis 318_y extending through the shaft 318. For example, as described later in FIG. 3A, the roller 120 may define a roller opening 120_RO that extends through the roller 120. The shaft 318 may extend through a center of the roller 120, through the roller opening 120_RO, in the Y direction. Also, the shaft 318 may be connected to the roller 120; consequently, the roller 120 may rotate when the shaft 318 rotates. Additional details for an example of a roller 120 are described below with reference to FIG. 3A.

In some embodiments, a material of the hopper assembly 200 may include a metal (e.g., aluminum), a metal alloy (e.g., steel), a plastic (e.g., polyether ketone (PEEK), polyoxymethylene (an acetal homopolymer resin corresponding to the trademark DELRIN®, held by DuPont™), or any combination thereof. A material of the roller 120 may include a plastic, such as PEEK, polyoxymethylene, or both PEEK and polyoxymethylene. However, example embodiments are not limited thereto and the roller 120 may alternatively be formed of other materials such as a metal, a metal alloy, and/or a different plastic.

FIGS. 1C, 1D, 1E, 1G, 1L, and 1M are partial views of a doser assembly with some structures omitted according to an example embodiment.

Figure 1C:
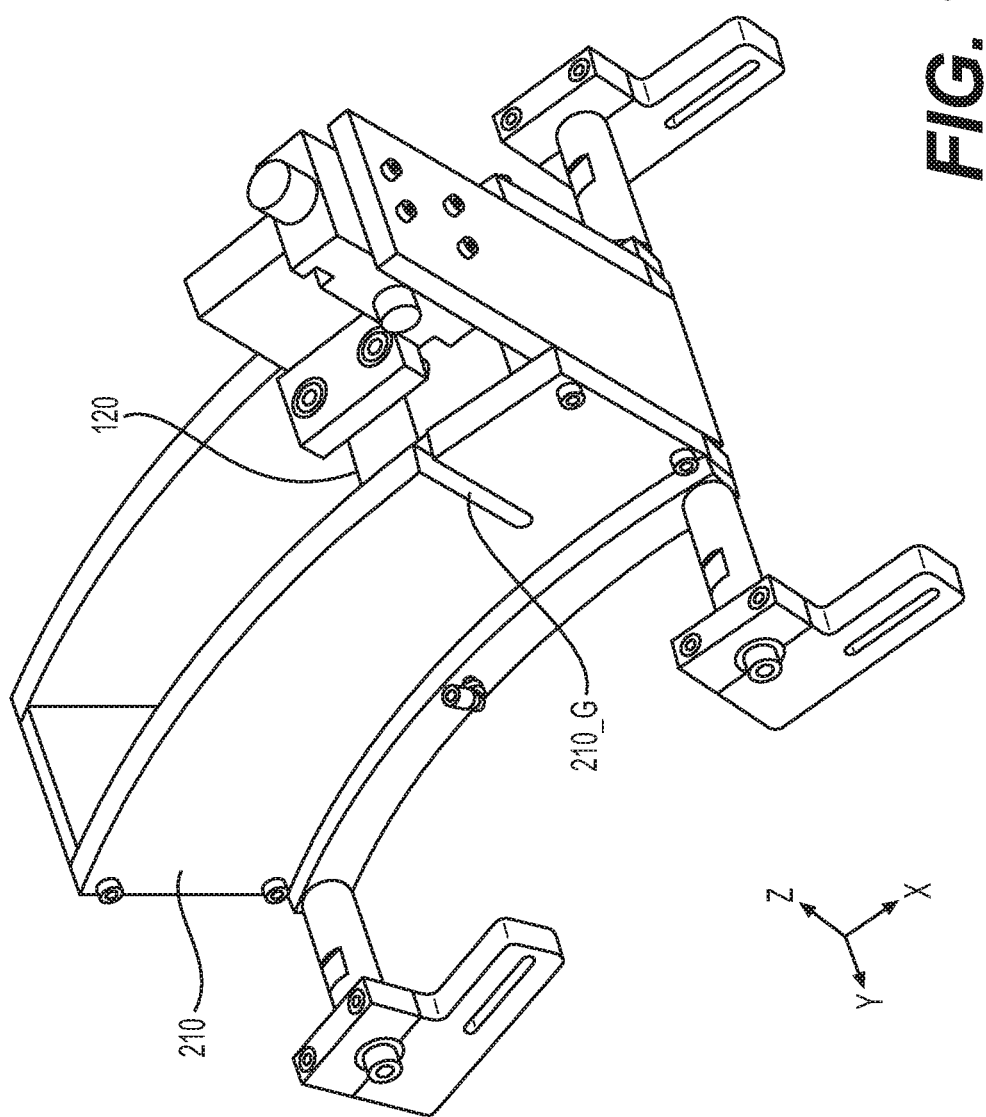
FIGS. 1C, 1D, 1E, 1G, 1L, and 1M are partial views of a doser assembly with some structures omitted according to an example embodiment.
Figure 1D:
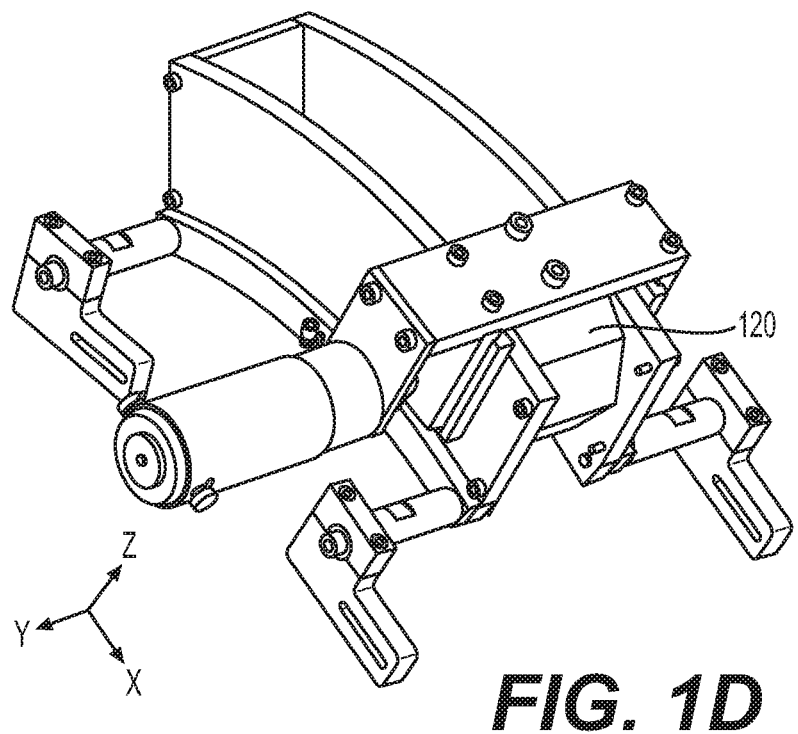
Figure 1E:
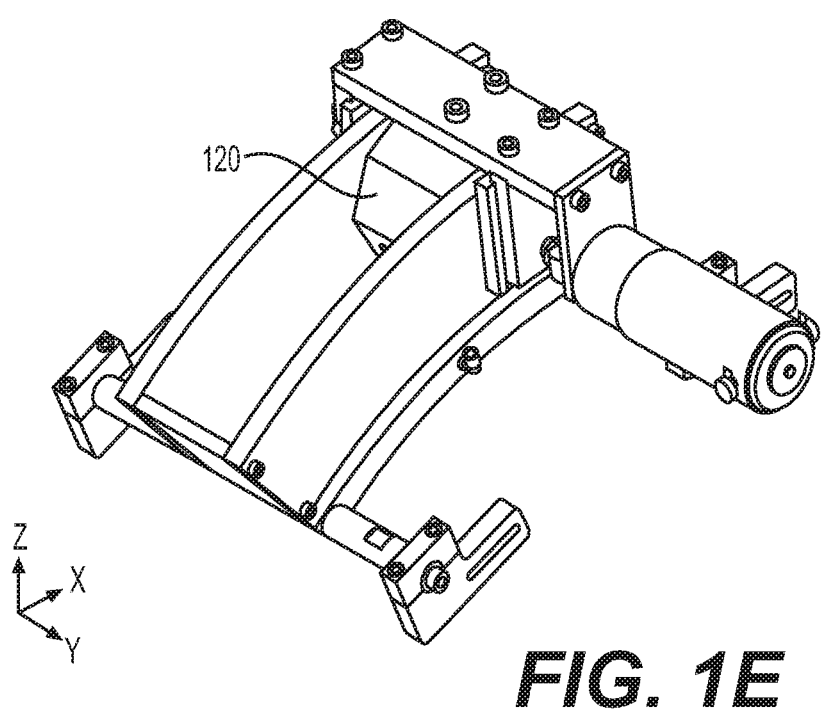
Figure 1F:
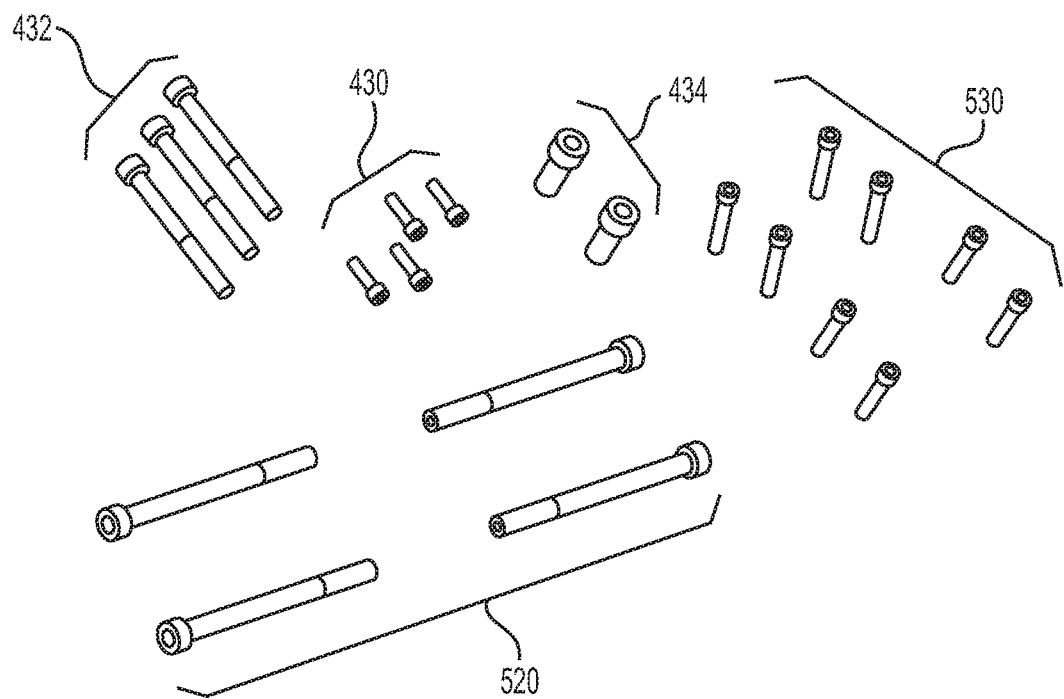
FIG. 1F illustrates some fastening members in a doser assembly in FIG. 1A according to an example embodiment.
Figure 1G:
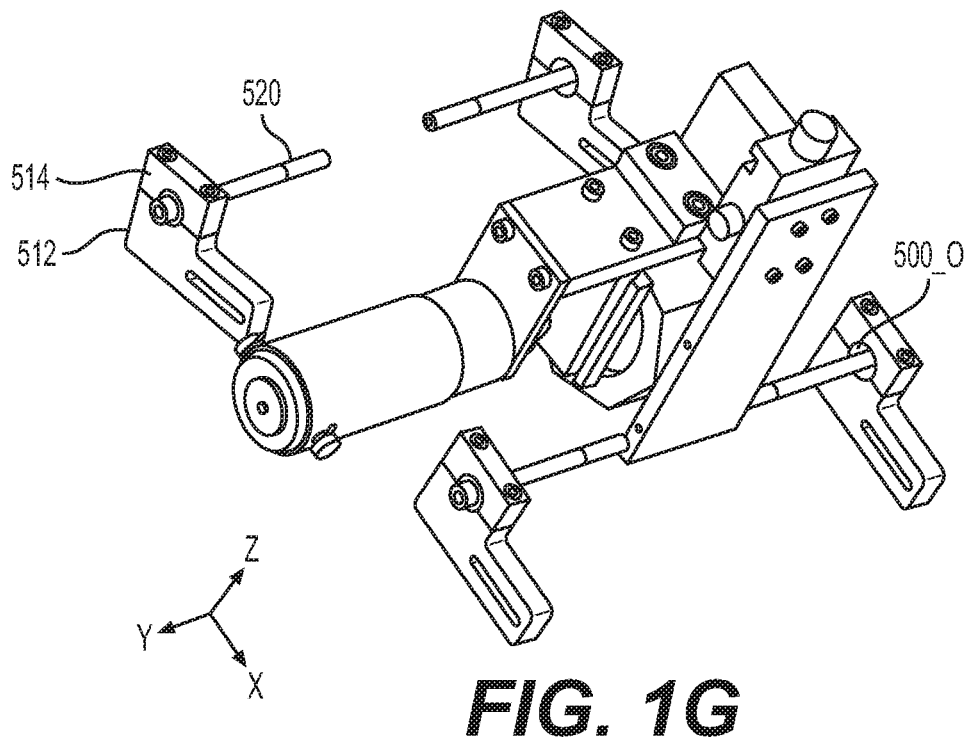
Figure 1H:
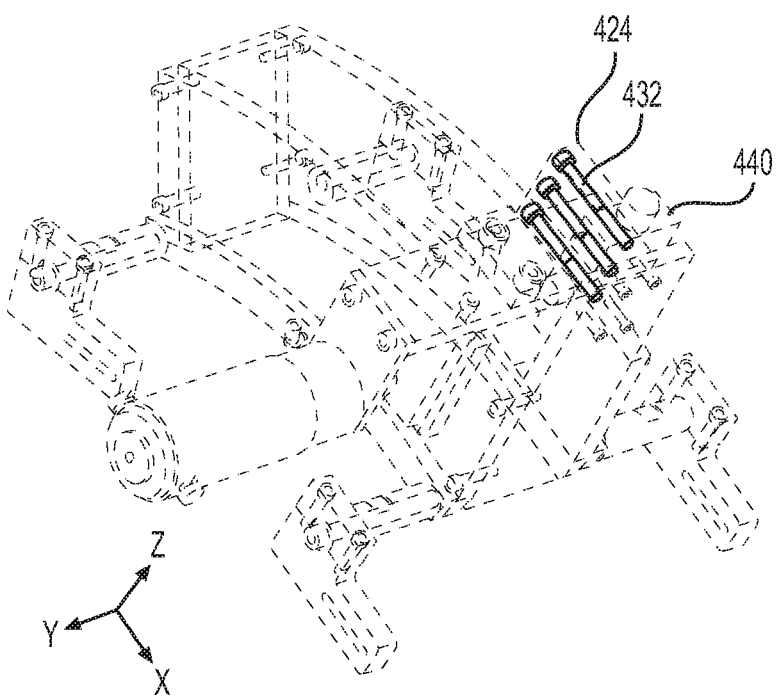
FIGS. 1H to 1K are partial transparent views of a doser assembly according to an example embodiment.
Figure 1I:
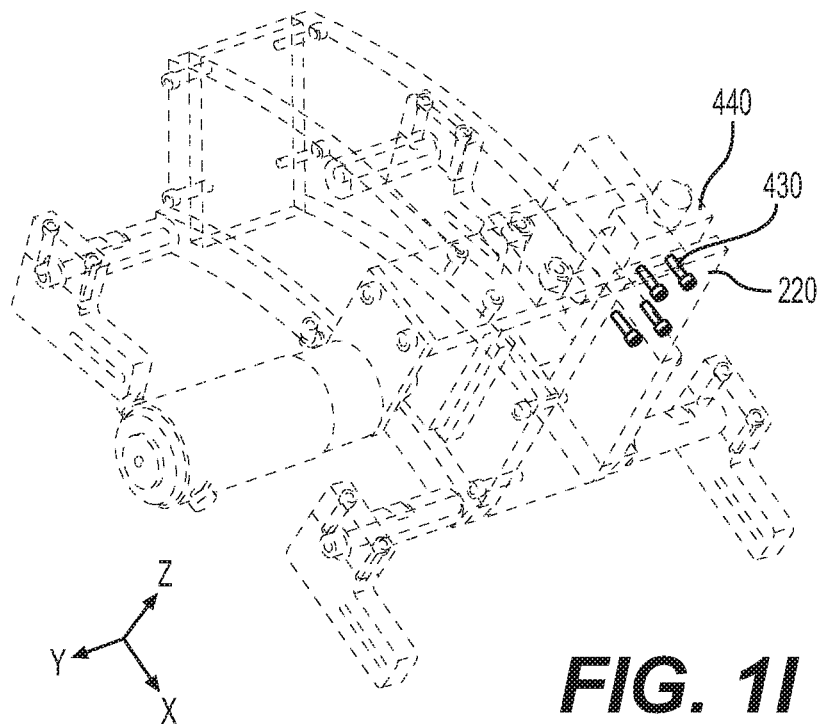
Figure 1J:
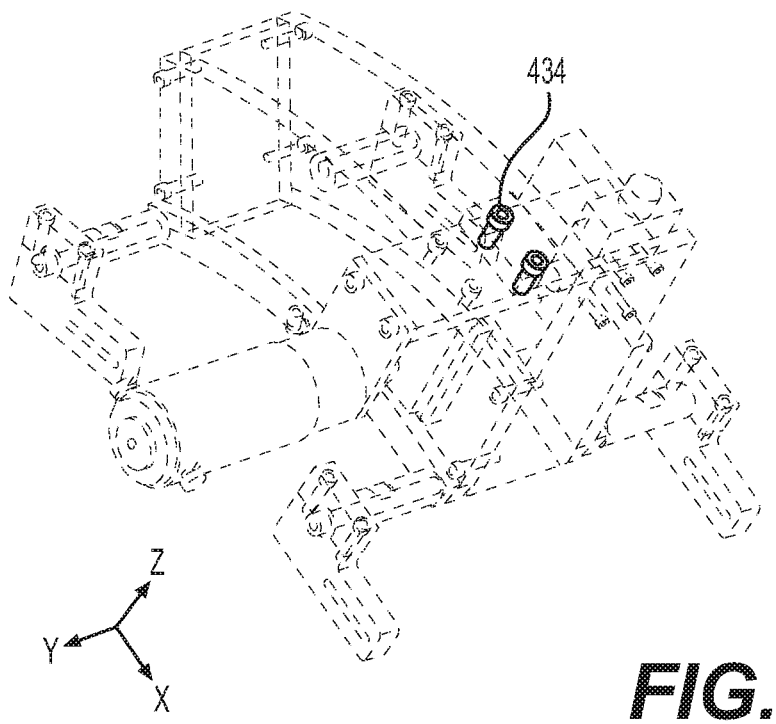
Figure 1K:
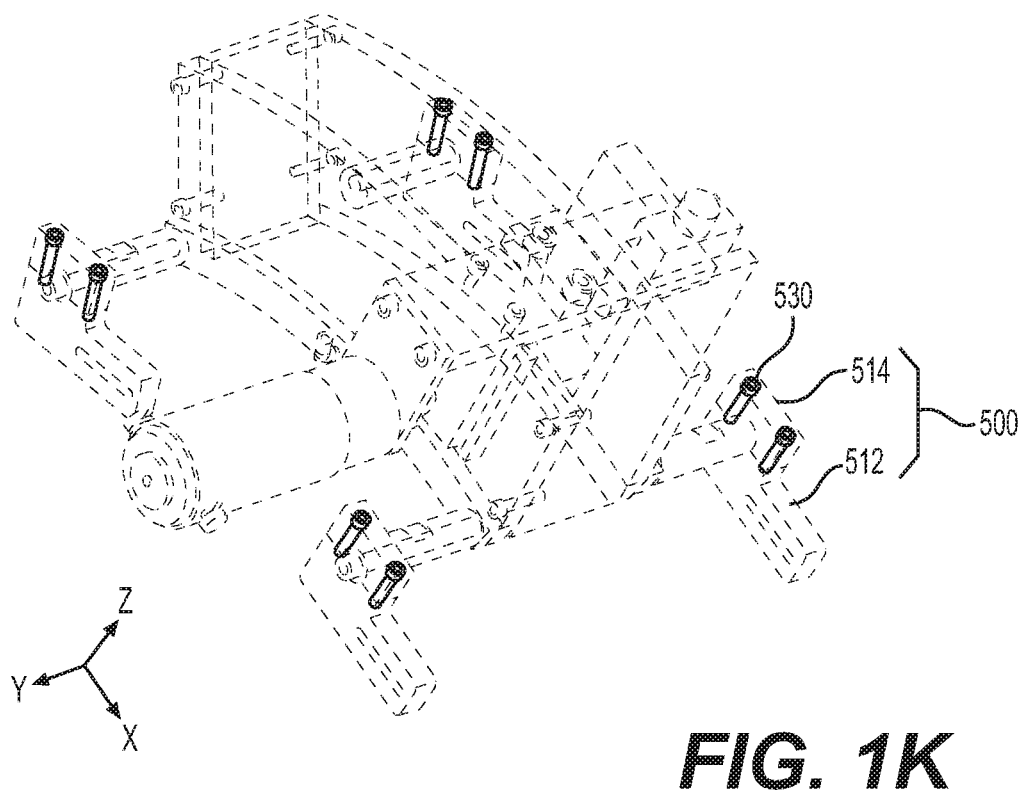
Figure 1L:
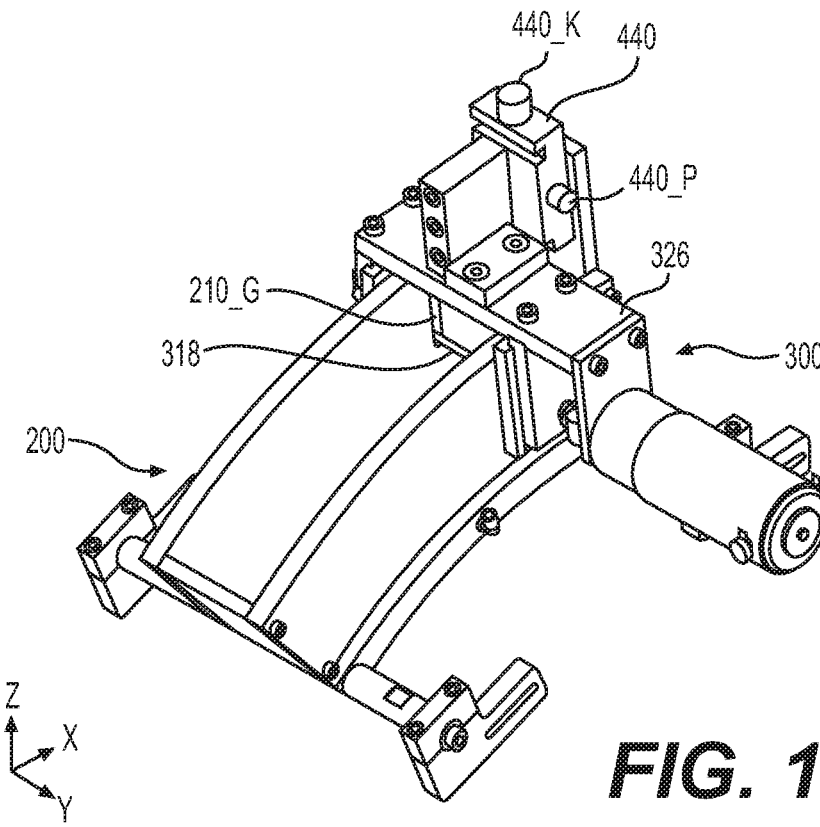
Figure 1M:
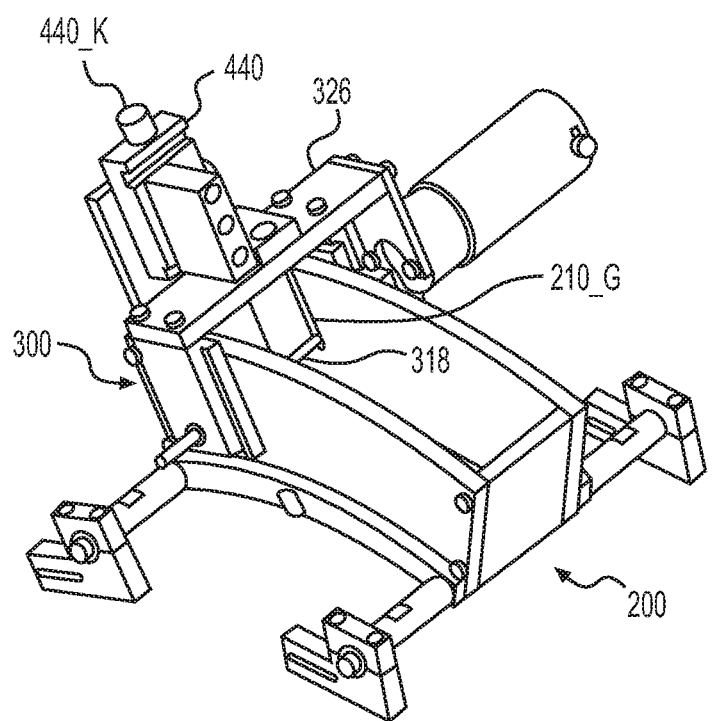

Referring to FIGS. 1A, 1B, 1C, 1D, 1E, 1G, 1L, and 1M, FIG. 1C illustrates a partial view of the doser assembly 100 where the bracket assembly 300 has been removed, FIGS. 1D and 1E illustrate a partial view of the doser assembly 100 where a fourth wall 220 of the hopper assembly 200 has been removed, FIG. 1G illustrates a partial view of the doser assembly 100 where the hopper assembly 200 has been removed to expose second screws 520 extending through lower and upper portions 512 and 514 of a support structure, and FIGS. 1L and 1M illustrate a partial view of the doser assembly 100 where the roller 120 has been omitted to expose the shaft 318 extending between the hopper grooves 210_G.

FIG. 1F illustrates some fastening members in the doser assembly in FIG. 1A.

Referring to FIG. 1F, second screws 520, third screws 430, fourth screws 434, fifth screws 432, and sixth screws 530 are shown. A size (e.g., length) of the third screws 430 may be less than a size of the second screws 520, fourth screws 434, fifth screws 432, and sixth screws 530. A size of the second screws 520 may be greater than a size of the third screws 430, fourth screws 434, fifth screws 432, and sixth screws 530. A size of the fifth screws 432 may be greater than a size of the third screws 430, fourth screws 434, and sixth screws 530.

FIGS. 1H to 1K are partial transparent views of the doser assembly in FIG. 1A to illustrate an arrangement of some fastener members. As shown in FIG. 1H, fifth screws 432 may connect a vertical coupling piece 424 to the vertical adjuster 440. As shown in FIG. 1I, the third screws 430 may connect a fourth hopper wall 220 to the vertical adjuster 440. As shown in FIGS. 1A and 1J, fourth screws 434 may connect a horizontal coupling piece 422 (see FIG. 5A) to a horizontal piece 326 (see FIG. 4A) of the bracket assembly 300. As shown in FIG. 1K, sixth screws 530 may connect the lower and upper portions 512 and 514 of the support structures 500 together.

Referring to FIGS. 1A, 1B, and 3B, a first group of support structures 500 may be spaced apart from a first side of the hopper assembly 200, and a second group of support structures 500 may be spaced apart from a second side of the hopper assembly 200. A first group of lateral extension members 240 may extend from the first side of the hopper assembly 200 and connect one-to-one respectively with the first group of support structures 500. A second group of lateral extension members 240 may extend from the second side of the hopper assembly 200 and connect one-to-one respectively with the second group of the support structures 500.

Referring to FIGS. 1A, 1B, 1L, and 1M, a vertical adjuster 440 may be connected to the bracket assembly 300. The vertical adjuster 440 may be connected to the horizontal piece 326 of the bracket assembly 300. The vertical adjuster 440 may be configured to adjust a position of at least a portion the bracket assembly 300 in the Z direction. The vertical adjuster 440 may include a knob 440_K. The vertical adjuster 440 may be configured to adjust the position of the shaft 318 of the bracket assembly 300 in the Z direction in response to the knob 440_K being rotated in a clockwise and/or a counterclockwise direction. For example, rotating the knob 440_K in the clockwise direction may raise shaft 318 in the Z direction and rotating the knob 440_K in the counterclockwise direction may lower the shaft 318 in the Z direction, or vice versa (e.g., counterclockwise rotation of the knob 440_K may raise shaft 318 in the Z direction and clockwise rotation of the knob 440_K may lower the shaft 318 in the Z direction).

As shown in FIGS. 1L and 1M, an upper surface of the hopper assembly 200 may define first and second hopper grooves 210_G that face each other and are spaced apart from each other. The shaft 318 may extend through the first and second hopper grooves 210G. As shown in FIG. 1C, the roller 120 may be positioned between the first and second hopper grooves 210G. Because the shaft 318 may extend through the roller 120 and may be connected to the roller 120, the vertical adjuster 400 may be configured to adjust a position of the roller 120 in the Z direction based on adjusting the position of the shaft 318 in the Z direction. The vertical adjuster 400 may be configured to raise or lower the shaft 318 position in the Z direction, based on raising or lowering the shaft 318 position in the first and second grooves 210G.

Referring to FIGS. 1A and 1B, The vertical adjuster 440 may further include an adjuster pin 440_P that may be configured to fix the position of the shaft 318 (and roller 120) in place in response to the pin 440_P being tightened and/or inserted into the vertical adjuster 440. The adjuster pin 440_P may be configured to unfix the position of the shaft 318 (and roller 120) in response to the adjuster pin 440_P being loosened and/or withdrawn from the vertical adjuster 440.

Although not illustrated, the vertical adjuster 440 may include a plurality of knobs, such as one knob for coarse adjustment and another knob for fine adjustment. In an example embodiment, the vertical adjuster 440 may be configured to lower the shaft 318—and adjust the roller 120 in the process—to move the roller 120 so a bottommost surface of the roller 120 may be at a target level. In some embodiments, the target level may be within about 0 inches to about ⅛ inch (0.125 inches) of a bottom surface of a part of the hopper assembly 200, and/or within about 10/10,000 inches to about 15/10,000 inches of a bottom surface of a part of the hopper assembly 200. For example, as shown in FIG. 2E, the target level may correspond to an offset distance OD between a bottom surface of the first and/or second hopper wall 210 at one end of the hopper assembly 200. However, the target level of the roller 120 may be set to a different offset distance OD depending on the application.

FIG. 2E also illustrates spacer structures 330 of the bracket assembly 300 may contact the first and/or second hopper wall 210. Although not illustrated in FIGS. 1A, 1B, 1L, and 1M, the doser assembly 100 may include at least one additional roller and the position of the additional roller may be different than the roller 120. For example, FIG. 7B illustrates a doser assembly 100' that includes a first roller 120 and second roller 120' that are spaced apart from each other and may be adjusted to different vertical positions.

Referring to FIGS. 1A and 1B, the vertical adjuster 440 may be a type where the knob 440_K may be connected to an internal rack and pinion system for varying the Z direction; however, example embodiments are not limited thereto. Various types of vertical adjusters may be used for the vertical adjuster 440, provided that the vertical adjuster 440 is capable of precisely varying the Z-direction level (e.g., capable of varying the Z-direction level in increments of 1/10 inch, 1/100 inch, 1/1,000 inch, and/or 5/10,000 inch) of at least part of the bracket assembly 300 to adjust the Z-direction level of the shaft 318. For example, while not shown, the vertical adjuster 440 may include an internal structure for varying a position of at least part of the bracket assembly 300 (e.g., a position of the shaft) in the Z direction by rotating the knob 440_K, which may be the same as (or similar) to how some the stage of some microscopes may be adjusted vertically by rotating a knob on some microscopes. In some embodiments, the vertical adjuster 440 may include a pin for engaging a rack, but is not limited thereto. Additional details of an example vertical adjuster 440 are described later with reference to FIGS. 5C and 5D.

Figure 3A:
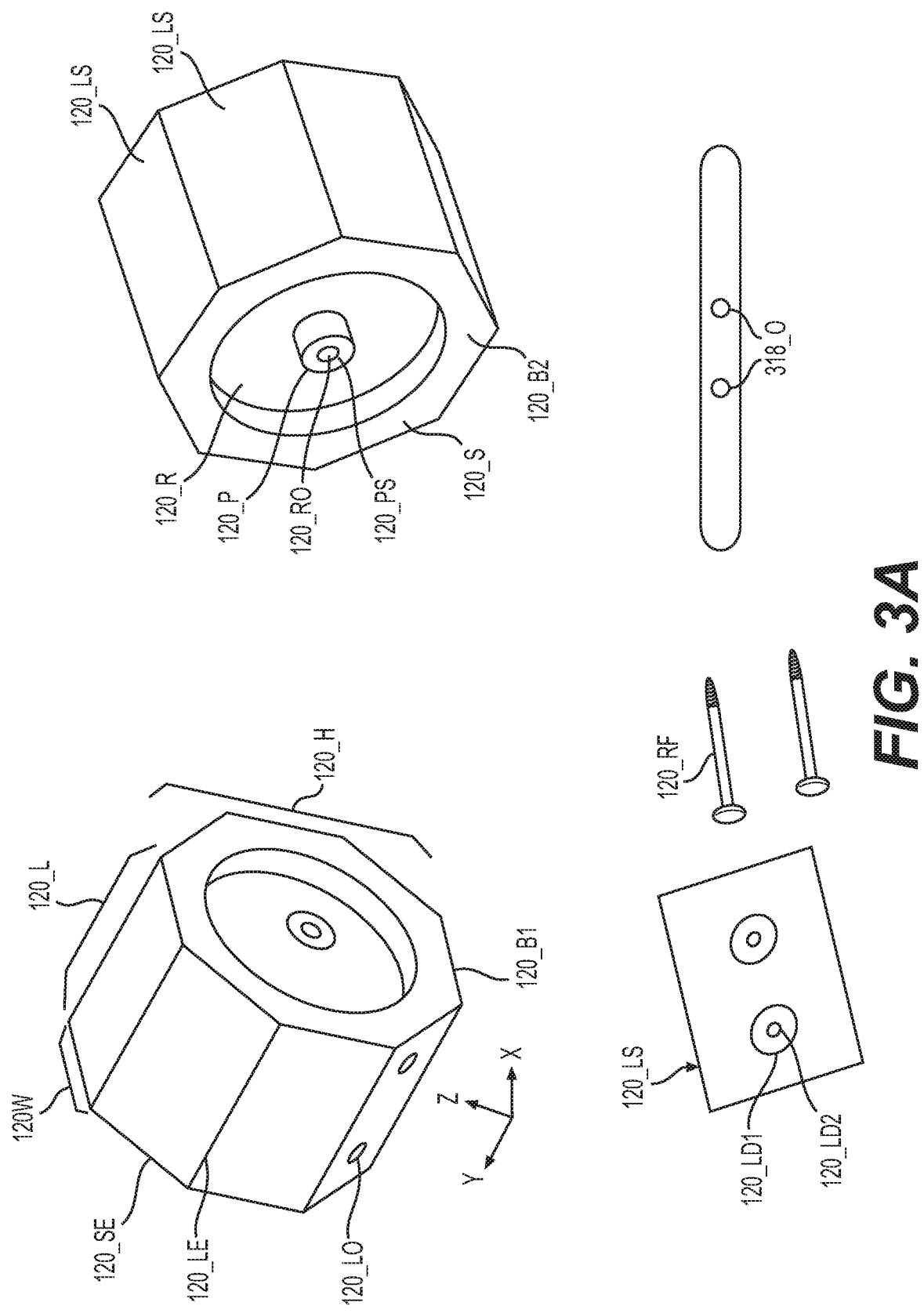
FIGS. 3A, 3B, and 3C are perspective views of a roller, a first portion of a hopper assembly, and a second portion of the hopper assembly according to an example embodiment.
Figure 3B:
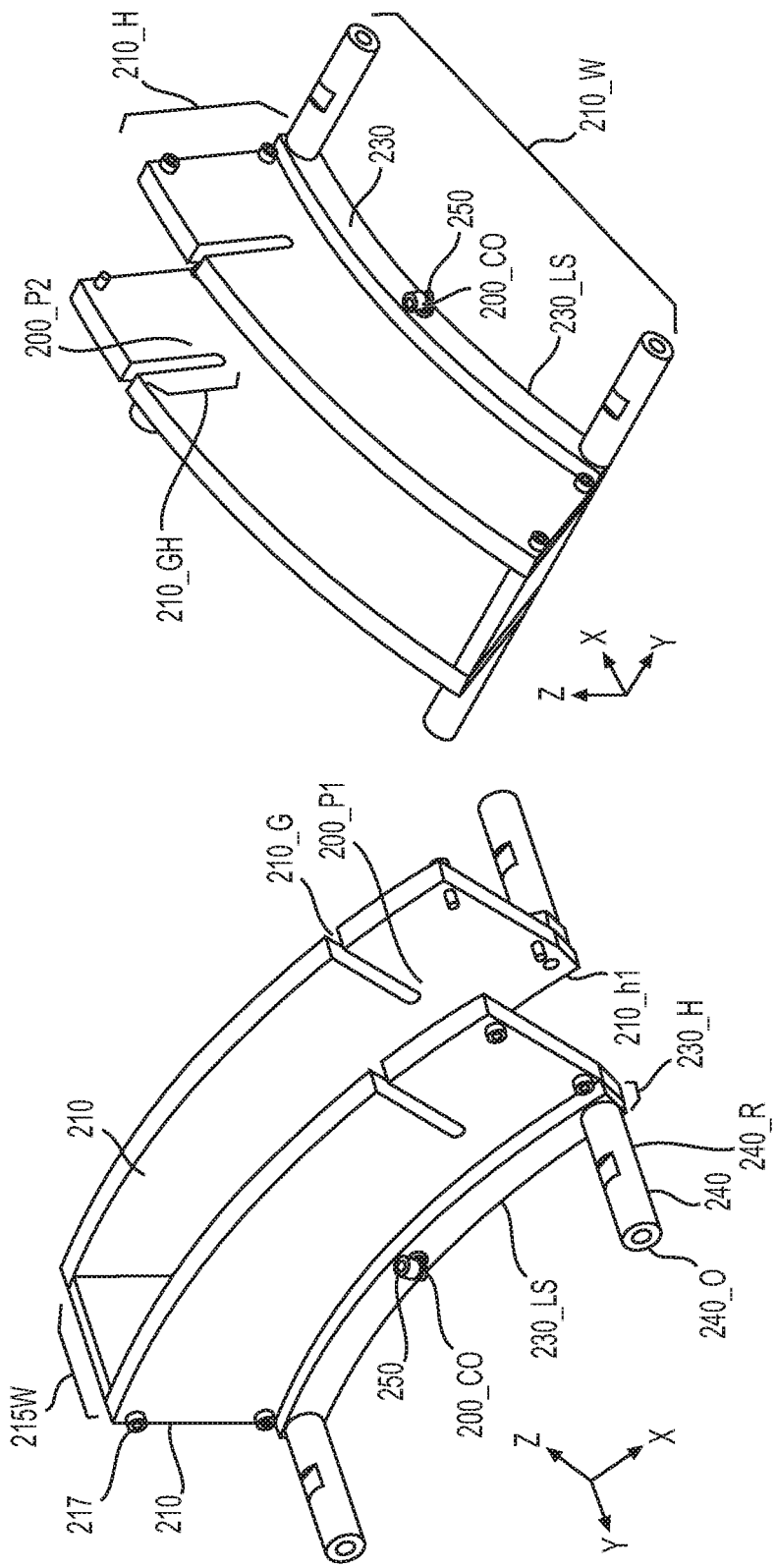

FIG. 3A includes perspective views of a roller according to an example embodiment.

Referring to FIG. 3A, in an example embodiment, the roller 120 may have a prism-like shape. For example, the roller 120 may include a first roller base 120_B1 and a second roller base 120_B2 connected to each other with a plurality of lateral faces 120_LS therebetween. A shape of the first roller base 120_B1 may be the same as a shape of the second roller base 120_B2.

As illustrated in FIG. 3A, the shape of the first roller base 120_B1 and the shape of the second roller base 120_B2 may each be polygons (e.g., regular polygons). For example, the shapes of the first roller base 120_B1 and second roller base 120_B2 may each have an octagonal perimeter, which may be a regular octagon. In which case, when the shape of the first roller base 120_B1 and the shape of the second roller base 120_B2 have an octagonal perimeter, the plurality of lateral faces 120_LS may include eight lateral faces: a first lateral face to an eighth lateral face. Each of the eight lateral faces may have a same size. A length 120_L of each one of the eight lateral faces 120_LS may be greater than a width 120_W of each one of the eight lateral faces. The eight lateral faces 120_LS may have straight lateral edges 120_LE and side edges 120_SE. The length of at least one of the eight lateral faces 120_LS may be a length of the roller 120. The width of at least one of the eight lateral faces 120_LS may be a width of an edge of the first roller base 120_B1 and/or a width of an edge of the second roller base 120_B2.

While FIG. 3A illustrates an example where the roller 120 has shape like a regular octagonal prism, inventive concepts are not limited thereto and the roller 120 may alternatively be embodied in different forms. For example, in other embodiments, the roller 120 may be a shape like a regular polygonal prism including fewer than eight lateral faces (e.g., a rectangular prism including four lateral faces, a pentagonal prism including five lateral faces, a hexagonal prism including six lateral faces, etc.) or more than eight lateral faces (e.g., decagonal prism including ten lateral faces, a dodecahedral prism including twelve lateral faces, etc.). In other words, the example roller 120 shown in FIG. 3A is a non-limiting example.

Referring to FIG. 3A, the first roller base 120_B1 may include a first recess 120_R that defines a first roller protrusion 120_P that extends from a center of the first roller base 120_B1 and may be surrounded by the first recess 120_R. Likewise, the second roller base 120_B2 may include a second recess 120_R that defines a second roller protrusion 120_P that extends from a center of the second roller base 120_B2 and is surrounded by the second recess 120_R. The recess 120_R may reduce a contact area between the roller 120 and interior surfaces of the hopper assembly 200 (see FIG. 1B) when the roller 120 is in the hopper assembly 200, which may reduce friction between the roller 120 and hopper assembly 200 when the roller 120 rotates. Also, the recess 120_R may limit plant material from getting stuck between an interior surfaces of hopper assembly 200 and the exterior surface of the first roller base 120_B1 and/or the second roller base 120_B2 because some plant material might move to the recesses 120_R instead.

A surface 120_PS of the first roller protrusion 120_P may be coplanar with a surface 120_S of the first roller base 120_B1 that surrounds the first recess 120_R and the first roller protrusion 120_P. A surface of the second roller protrusion 120_P may be coplanar with a surface of the second roller base 120_B2 that surrounds the second recess 120_R and the second roller protrusion 120_P. Alternatively, the roller protrusion 120_P at the first roller base 120_B1 and/or second roller base 120_B2 may be recessed inward by a distance that is less than a depth of the recess 120_R surrounding the roller protrusion 120_P.

The roller 120 may define a roller opening 120_RO that extends from the first roller protrusion 120_P at the first roller base 120_B1 through the roller 120 to the second roller protrusion 120_P at the second roller base 120_B2. The shaft 318 (see e.g., FIG. 2D to 2E) may extend through the roller opening 120_RO. A length of the shaft 318 may be longer than a length of the roller so a portion of the shaft 318 may protrude from the roller opening 120_RO away from the first roller base 120_B1 and the second roller base 120_B2.

The roller 120 may include on or more structures for securing the roller 120 to the shaft 318. For example, at least one of the plurality of plurality of lateral faces 120_LS may define face openings 120_LO in fluid communication with the roller opening 120_RO at a portion of the roller opening 120_RO between the first roller base 120_B1 and the second roller base 120_B2. The face openings 120_LO may be spaced apart from each other. The roller 120 may further include roller fasteners 120_RF connected to the shaft 318 through face openings 120_LO. Each one of the roller fasteners 120_RF may be connected to the shaft 318 through a corresponding one of face openings 120_LO. For example, the roller fasteners 120_RF may be screws that screw into threaded openings 318_0 on the shaft 318. A head of each one of the roller fasteners 120_RF may be level with or recessed relative to an exterior surface of the lateral face 120_LS that defines the face opening 120_LO that the fastener 120_RF is inserted into. For example, the face opening 120_LO may include a first diameter 120_LD1 that is greater than a second diameter 120_LD2 recessed into the roller 120. A size of the roller faster 120_RF may be between the first diameter 120_LD1 and the second diameter 120_LD2.

Figure 3C:
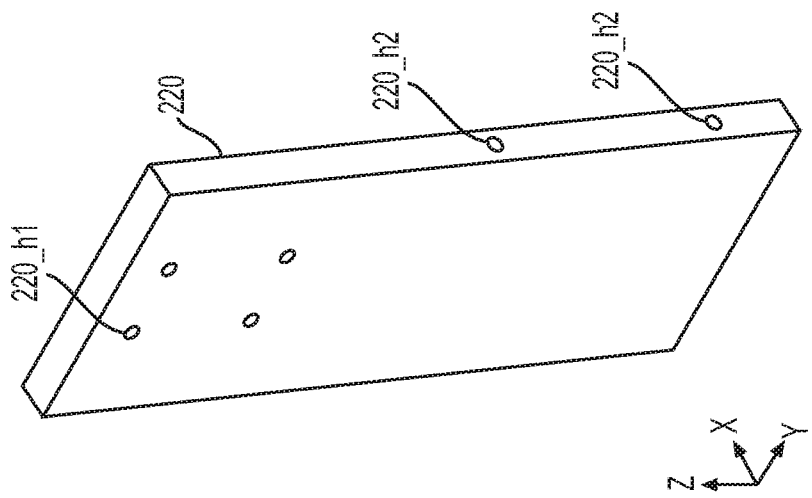
Figure 3C:
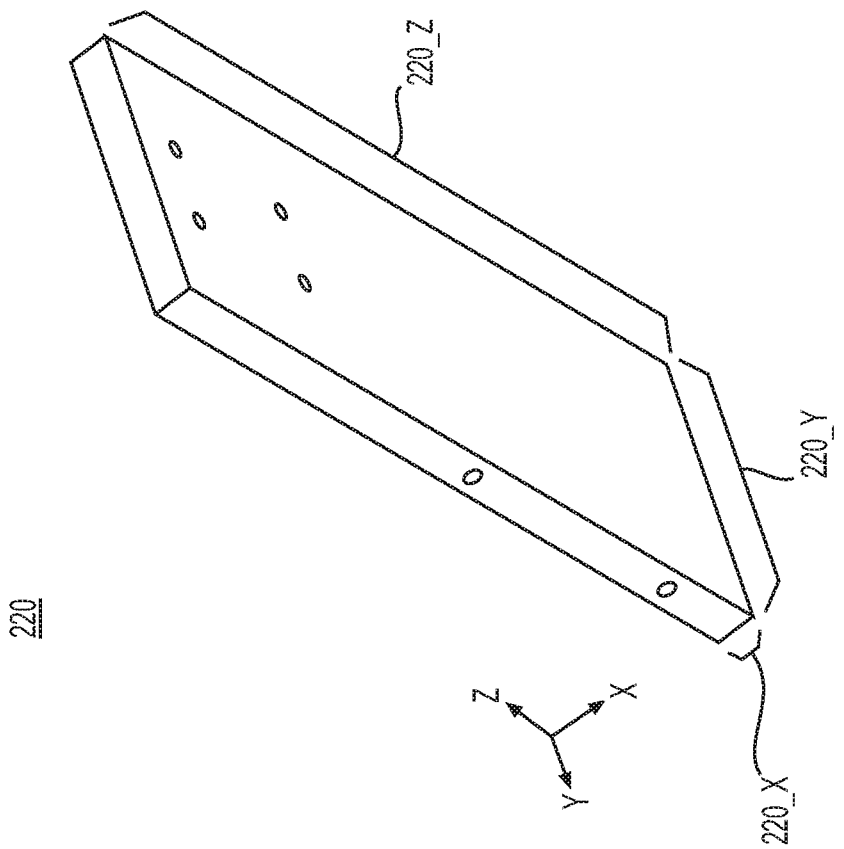

FIGS. 3B and 3C are perspective views of a first portion of a hopper assembly and a second portion of the hopper assembly according to an example embodiment. The first portion of the hopper assembly 200 may include parts of the hopper assembly 200 except for the fourth hopper wall 220. The second portion of the hopper assembly 200 may include the fourth hopper wall 220.

Referring to FIGS. 1A, 1B, and 3B, a lower surface 230_LS of a first side of the hopper assembly may be concave. A lower surface 230_LS of a second side of the hopper assembly may be concave. The first side of the hopper assembly 200 and the second side of the hopper assembly 200 may each extend in the X direction and may be spaced apart from each other in the Y direction. The hopper assembly 200 may include hopper walls 210. The hopper walls 210 may each extend a width 210_W in the X direction, face each other, and may be spaced apart from each other in the Y direction. The hopper walls 210 may have a height 210_H in the Z direction that is less than the width 210_W. The hopper wall 210 on the same side of the doser assembly 100 as the motor 310 may be referred to as a first hopper wall 210 and the hopper wall 210 further away from the motor 310 may be referred as a second hopper wall 210. The first and second sides of the hopper assembly 200 may correspond to the first and second hopper walls 210. As shown in FIG. 3B, inner surfaces of the first and second hopper walls 210 may include a first part 200_P1 of the interior surface of the hopper assembly 200 and a second part 200_P2 of the interior surface of the hopper assembly spaced apart from each other in the Y direction.

Lower surfaces of the first and second hopper walls 210 may be concave. An upper surface of the first and/or second hopper walls 210 may be convex. A shape of the first and second hopper walls 210 may be the same. The lower surface of the first hopper wall 210 may be level with the lower surface of the second hopper wall 210. Both edges of the first hopper wall 210 may be coplanar with corresponding edges of the second hopper wall 210. Upper surfaces of the first hopper wall 210 and the second hopper wall 210 may be level with each other.

Referring to FIG. 3B, at least one of the first and second hopper walls 210 may include the hopper groove 210_G that descends from an upper surface of the first and/or second hopper wall 210 and has depth in the Z direction 210_GH that is less than a distance in the Z direction between the lower surface and upper surface of the first and/or second hopper wall 210 at a location adjacent to the hopper groove 210_G. When both the first and second hopper walls 210 include a hopper groove 210_G, the hopper grooves 210_G of the first and second hopper walls 210 may be spaced apart from each other and at least partially aligned with each other. The hopper grooves 210_G in the first and second hopper walls 210 may be referred to as the first and second hopper grooves 210_G, respectively. The first and second hopper grooves 210_G may have the same depth and width. While FIG. 3B illustrates an example where both the first hopper wall 210 and the second hopper wall 210 include hopper grooves 210_G that are about the same size, example embodiments are not limited thereto and the first and second hopper grooves 210_G may alternatively be different sizes.

Referring to FIGS. 1C and 3B, the roller 120 may extend between the first and second hopper grooves 210_G of the first and second hopper walls 210. As shown in FIGS. 1L, 1M, and 2D, the shaft 318 may extend in the Y direction through the first hopper groove 210_G, roller 120, and second hopper groove 210_G.

Referring to FIGS. 1A, 1B, 3B, and 3C, the hopper assembly 200 may further include a third hopper wall 215 and a fourth hopper wall 220 that face each other. The third hopper wall 215 and the fourth hopper wall 220 may be spaced apart from each other in the X direction and may each have widths that extend in the Y direction. The third hopper wall 215 may be connected to the first hopper wall 210 and the second hopper wall 210 at a first end region of the hopper assembly 200. The fourth hopper wall 220 may be connected to the first hopper wall 210 and the second hopper wall 210 at a second end region of the hopper assembly 200. The interior surface of the hopper assembly 200 that defines the hopper opening 200_O may include at least a portion of the inner surfaces of the first and second hopper wall 210s, at least a portion of an inner surface of the third hopper wall 215, and at least a portion of an inner surface of the fourth hopper wall 220. The roller 120 may be adjacent to the inner surface of the fourth hopper wall 220 in hopper opening 200_O.

Referring to FIGS. 3B and 3C, a shape of the third hopper wall 215 may be different than a shape of the fourth hopper wall 220. A width 215w of the third hopper wall 215 in the Y direction may be the same as a width 220_Y of the fourth hopper wall 220 in the Y direction. A height 220_Z of the fourth hopper wall 220 in the Z direction may be greater than a height in the Z direction of the third hopper wall 215. A width of the fourth hopper wall 220 in the X direction 220_X may be the same as or different than the width of the third hopper wall 215 in the X direction. A width of the fourth hopper wall 220 in the X direction 220_X may be the same as or different than the width of the first and second hopper walls 210 in the Y direction. The fourth hopper wall 220 may include a plurality of first holes 220_h1 that extend in the X direction through an upper region the fourth hopper wall 220. Opposite sides of the fourth hopper walls 220 may include second holes 220_h2.

Referring to FIG. 3B, the hopper assembly 200 may include first screws 217. A first group of the first screws 217 may connect the first hopper wall 210 to a first edge of the third hopper wall 215 and a first edge of the fourth hopper wall 220, respectively. For example, the first group of first screws 217 may include two first screws 217 that may be spaced apart in the Z direction extend in the Y direction through first hopper wall 210 into the first edge of the third hopper wall 215. The first group of first screws 217 may further include two first screws 217 that are spaced apart from each other in the Z direction and extend in the Y direction through the first hopper wall into second holes 220_h2 of the first edge of the fourth hopper wall 220.

As shown in FIG. 3B, a second group of the first screws 217 may connect the second hopper wall 210 to a second edge of the third hopper wall 215 and a second edge of the fourth hopper wall 220, respectively. The second edge of the third hopper wall 215 may be opposite the first edge of the third hopper wall 215 in the Y direction. The second edge of the fourth hopper wall 220 may be opposite the first edge of the third hopper wall 220 in the Y direction. The second group of the first screws 217 includes may include two first screws 217 that are spaced apart from each other in the Z direction and extend in the Y direction through second hopper wall 210 into the second edge of the third hopper wall 215. The second group of first screws 217 may further include two first screws 217 that are spaced apart from each other in the Z direction and extend in the Y direction through first hopper wall 210 into the second edge of the fourth hopper wall 220.

Referring to FIG. 3B, the hopper assembly 200 may further include first and second base frames 230 connected to the first and second hopper walls 210. The base frames 230 may be attached to lower regions of the outer surfaces of the first and second hopper wall 210. Lower surfaces of the first and second base frames 230 may be concave and may correspond with and be level with the lower surfaces of the first and second hopper walls 210. The base frames 230 may be the same shape, but are not limited thereto and may be different shapes. Heights of the base frames 230 in the Z-direction 230_H may be less than heights of the hopper walls 210 in the Z-direction.

Referring to FIG. 3B, the hopper assembly 200 may further include one or more conduit lines 250. The conduit lines 250 may be configured to provide vacuum, gases, or both vacuum and gases into the hopper assembly 200 through corresponding conduit openings 200_CO in the hopper assembly 200. For example, the first base frame 230 and the first hopper wall 210 may define a first conduit opening 200_CO at a middle region of the first base frame 230 and a lower-mid region of the first hopper wall 210. Then, a first conduit line 250 may extend into the first conduit opening 200_CO and may be in fluid communication with the hopper opening 200_O illustrated in FIGS. 1A and 1B. Similarly, the second base frame 230 and the second hopper wall 210 may define a second conduit opening 200_CO at middle region of the second base frame 230 and a lower-mid region of the second hopper wall 210. The second conduit line 250 may extend into the second conduit opening 200_CO and may be in fluid communication with the hopper opening 200_O.

Referring to FIGS. 1A, 1B, and 3B, the hopper assembly 200 may further include a plurality of lateral extension members 240 connected to the first side and second side of the hopper assembly 200. For example, the lateral extension members 240 may be connected to end regions of the first and second base frame 230. A first group of the second screws 520, shown in FIGS. 1F and 1G, may extend through a first group of the lateral extension members 240 and corresponding openings in the base frame 230 and hopper walls 210 (see holes 210_h1 in FIG. 3B) towards the third hopper wall 215. A second group of the second screws 520, shown in FIGS. 1F and 1G, may extend through a second group of the lateral extension members 240 and corresponding openings in the base frame 230 and hopper walls 210 towards the fourth hopper wall 220.

Referring to FIG. 3B, each of the plurality of lateral extension members 240 may have a same shape. The lateral extension members 240 may be tubular. An outer surface of the lateral extension members 240 may define a lateral-extension recess 240_R, which may have a flat bottom surface and straight sidewalls. Each lateral-extension recess 240_R of each corresponding lateral extension member 240 may be between respective ends of the corresponding lateral extension member 240. Each lateral-extension recess 240_R may be in a middle region of the outer surface of the corresponding lateral extension member 240.

Even though FIG. 3B illustrates an example where the first and second conduit lines 250 extend into the conduit openings 200_CO defined in middle regions of the base frames 230 and lower-mid regions of the hopper walls 210, example embodiments are not limited thereto. For example, in other embodiments, more or fewer than two conduit lines 250 may extend into the hopper assembly 200 through corresponding conduit openings 200_CO. Additionally, the locations of the conduit openings 200_CO may be defined in other locations than those shown in FIG. 3B. Also, in other embodiments, one or more of the hopper walls 210, 215, and 220 may be combined into a unitary body rather than being connected to each other through the first screws 217.

Figure 4A:
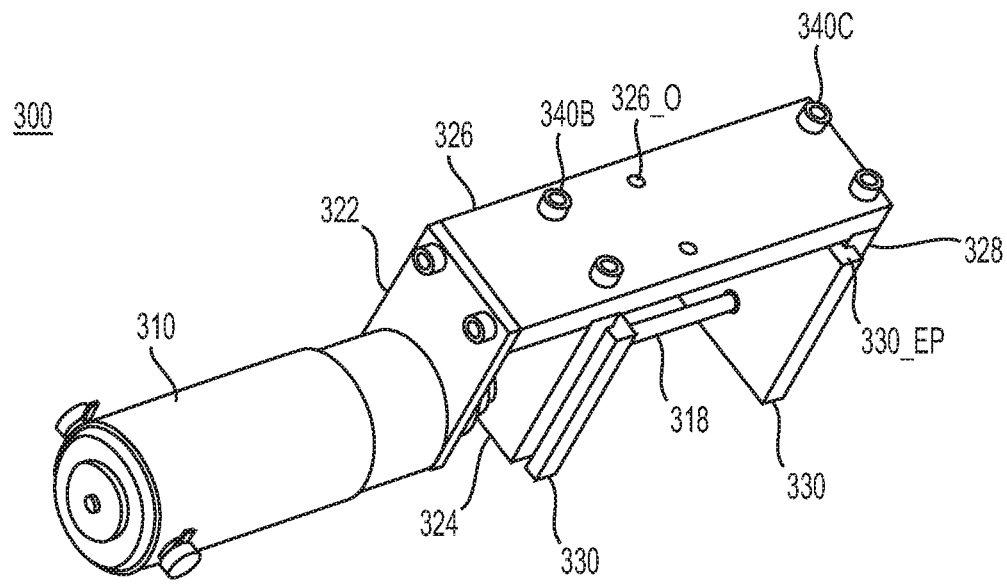
FIGS. 4A to 4G are a first perspective view, the first perspective view with an omitted item, a rear view, a second perspective view, a bottom view, a first side view, and a second side view of a bracket assembly in a doser assembly according to an example embodiment.
Figure 4B:
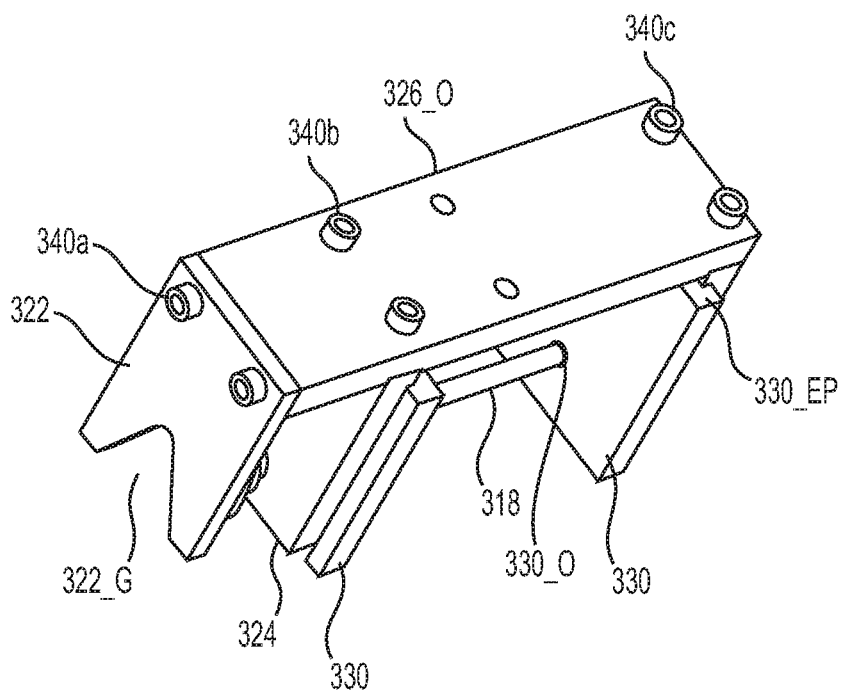
Figure 4C:
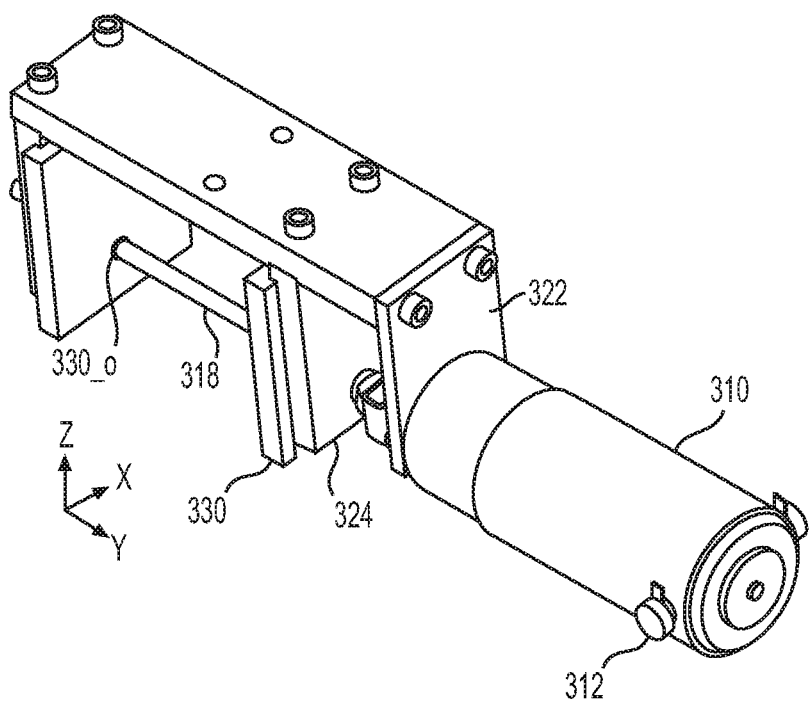
Figure 4D:
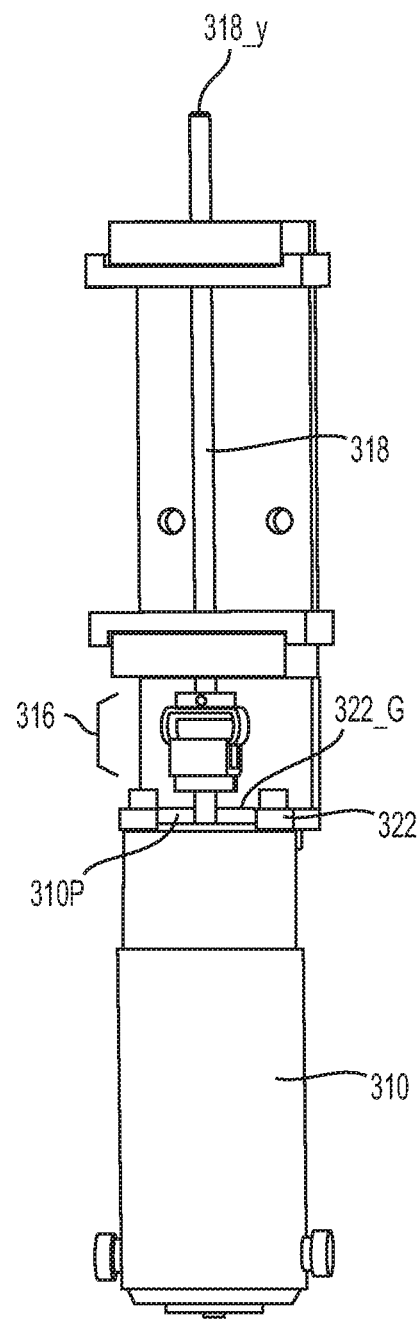
Figure 4E:
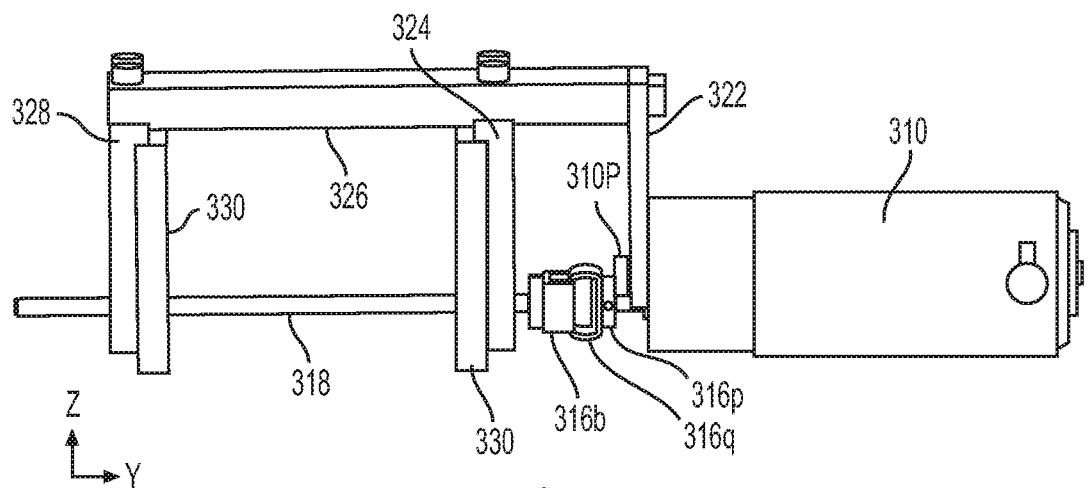
Figure 4F:
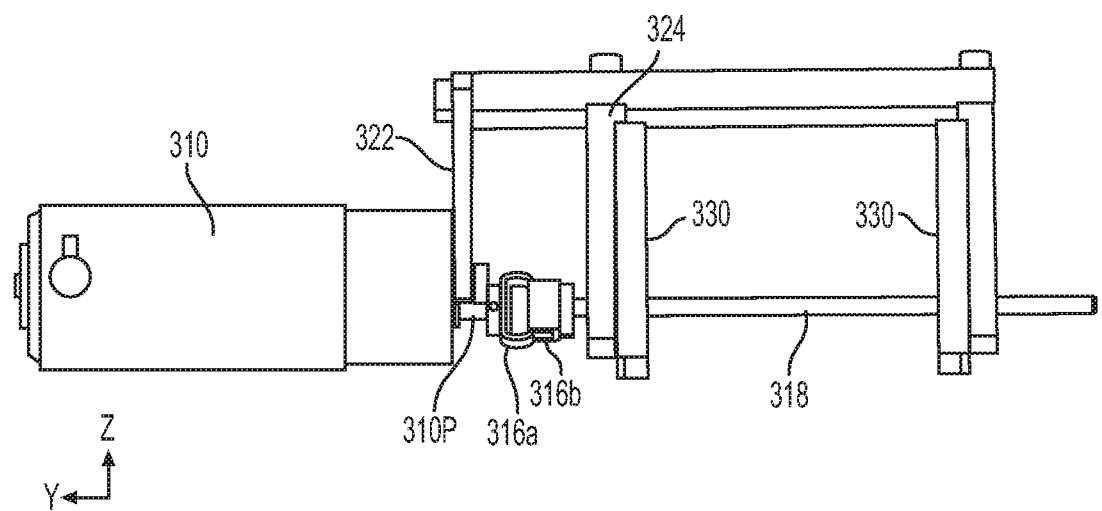
Figure 4G:
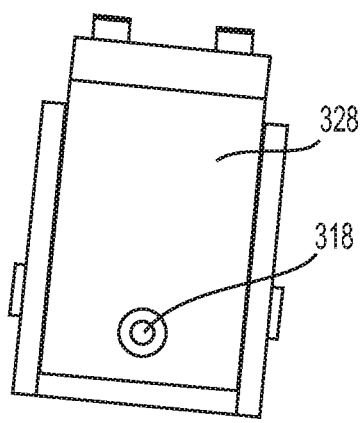

FIGS. 4A and 4C are a first perspective view and a second perspective view of a bracket assembly according to an example embodiment. FIG. 4B illustrates the bracket assembly of FIGS. 4A and 4C without the motor 310. FIG. 4D illustrates a bottom view of the bracket assembly. FIGS. 4E and 4F are a first side view and a second side view of the bracket assembly. FIG. 4G is a rear view of the bracket assembly.

Referring to FIGS. 1A, 1B, 3B, 4A to 4G, in an example embodiment, the bracket assembly 300 may include a horizontal piece 326. The horizontal piece 326 may extend in the Y direction over the roller 120, the portion of the hopper opening 200_O, and a region of the hopper assembly 200 that includes the first part 200_P1 and second part 200_P2 of the interior surface of the hopper assembly 200. A length of the horizontal piece 326 in the Y direction may be greater than a width of the hopper assembly 200 in the Y direction.

As shown in FIGS. 4A to 4G, the bracket assembly 300 may further include a first bracket wall 322, a second bracket wall 324, and a third bracket wall 328. The first bracket wall 322, the second bracket wall 324, and the third bracket wall 328 may be spaced apart from each other in the Y direction and connected to the horizontal piece 326. First bracket screws 340a (see FIG. 4B) may connect the first bracket wall 322 to an edge of the horizontal piece 326. Second bracket screws 340b (see FIGS. 4A and 4B) may extend through the horizontal piece 326 into a top of the second bracket wall 324 to connect the horizontal piece 326 to the second bracket wall 324. Third bracket screws 340c (see FIGS. 4A and 4B) may extend through the horizontal piece 326 into a top of the third bracket wall 328 to connect the horizontal piece 326 to the third bracket wall 328. The shaft 318 may extend in the Y direction through corresponding holes in the first bracket wall 322, the second bracket wall 324, and the third bracket wall 328.

Referring to FIGS. 4A to 4G, bracket assembly 300 may further includes a first spacer structure 330 next to the second bracket wall 324 and a second spacer structure 330 next to the third bracket wall 328. The first spacer structure 330 may be wedged between the second bracket wall 324 and an outer surface of a first side of the hopper assembly 200. The first and second spacer structures 330 may not be screwed to the second bracket wall 324, third bracket wall 328, or horizontal piece 326. The shaft 318 may extend through a first shaft opening 330_O (see FIGS. 4B and 4C) defined in the first spacer structure 330 and a second shaft opening 330_O defined in the second spacer structure 330. The second spacer structure 330 may be wedged between the third bracket wall 328 and a second side of the hopper assembly 200. Although FIGS. 4B and 4C illustrate an example where the spacer structures 330 define shaft openings 330_O that the shaft 318 extends through, example embodiments are not limited thereto. Alternatively, the spacer structure 330 may define slots and the shaft 318 may extend through the slots.

Referring to FIGS. 4A to 4C, 1L, and 1M, the vertical adjuster 440 may be configured to adjust a position of the horizontal piece 326, the first bracket wall 322, the second bracket wall 324, and the third bracket wall 328 in the Z direction in response to the knob 440_K being rotated. The vertical adjuster 440 may be configured to adjust the position of the second bracket wall 324 and third bracket wall 328 in the Z direction relative to the first spacer structure 330 and the second spacer structure 330 in the Z direction in response to the knob 440_K being rotated. In other words, as the positions of the first bracket wall 322, second bracket wall 324, and third bracket wall 328 change via adjustment with the vertical adjuster 440, the positions of the first and second spacer structures 330 may not change in response to adjustments by the vertical adjuster 440.

A material of the first and second spacer structure 330 may independently include steel, a metal (e.g., aluminum), a plastic (e.g., PEEK, polyoxymethylene, and the like), or any combination thereof. A material of the first bracket wall 322, second bracket wall 324, horizontal piece 326, and third bracket wall 328 may independently include steel, a metal (e.g., aluminum), a plastic (e.g., PEEK, polyoxymethylene, and the like), or any combination thereof. A material of the first and second spacer structure 330 may be different than a material of any one of the first bracket wall 322, second bracket wall 324, horizontal piece 326, and third bracket wall 328.

A width of the first and/or second spacer structures 330 may be wider than a width of second bracket wall 324 and/or a width of the third bracket wall 328. An edge portion 330_EP of the first and/or second spacer structure 330 may be thicker than a middle portion of the first and/or second spacer structure 330. An edge portion 330_EP of the first spacer structure 330 may wrap around at least part of a side of the second bracket wall 324. An edge portion 330_EP of the second spacer structure 330 may wrap around at least part of a side of the third bracket wall 328. The first and second spacer structures 330 may be the same size and/or may be different sizes. The first and second spacer structures 330 may face away from each other, such that a back of the first spacer structure 330 may face a back of the second spacer structure 330.

Referring to FIGS. 4B and 4D, a lower surface of the first bracket wall 322 may define a bracket groove 322_G. The bracket groove 322_G may have a height that is less than a height of the first bracket wall 322.

As shown in FIGS. 4D to 4F, the bracket assembly 300 may further include a rotor coupling 316 that connect a motor portion 310P of the motor 310 to one end of the shaft 318. The rotor coupling 316 may include a first coupling piece 316a, a second coupling piece 316b, and a coupling pin 316p for securing the first coupling piece 316a to the second coupling piece 316b. The first coupling piece 316a may be connected to the motor portion 310P. The second coupling piece 316b may be connected to the one end of the shaft 318. The motor portion 310P may extend through the bracket groove 322_G. The rotor coupling 316 may be positioned between the first bracket wall 322 and the second bracket wall 324. The shaft 318 may extend from the second coupling piece 316b through the second bracket wall 324 and third bracket wall 328. As shown in FIGS. 4E to 4F, a top portion of the second bracket wall 324 may extend between a lower surface of the horizontal piece 326 and a top surface of the first spacer structure 330 toward the third bracket wall 328. A top portion of the third bracket wall 328 may extend between a lower surface of the horizontal piece 326 and a top surface of the second spacer structure 330 toward the second bracket wall 324.

Figure 5A:
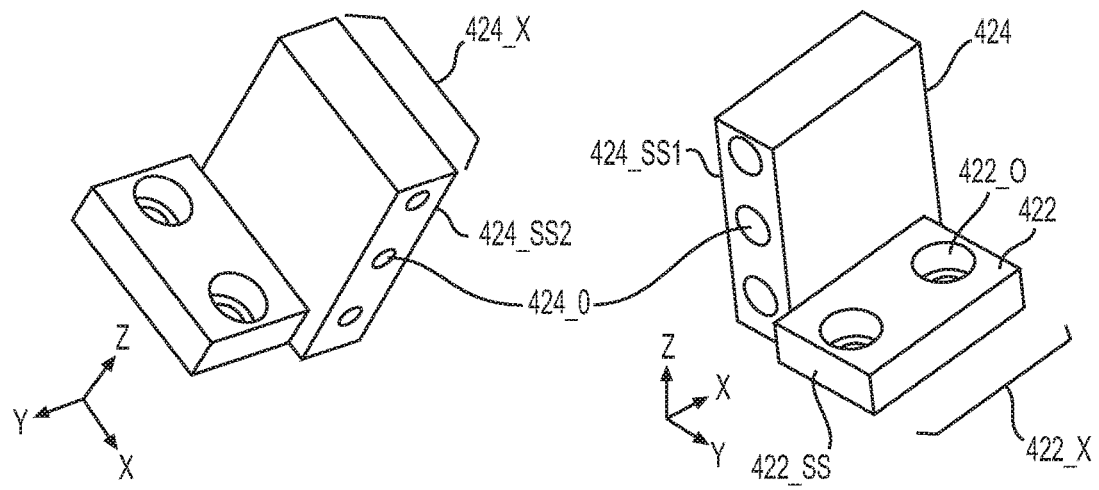
FIGS. 5A and 5B illustrates perspective views and side views of a horizontal coupling piece and a vertical coupling piece in a doser assembly according to an example embodiment.
Figure 5B:
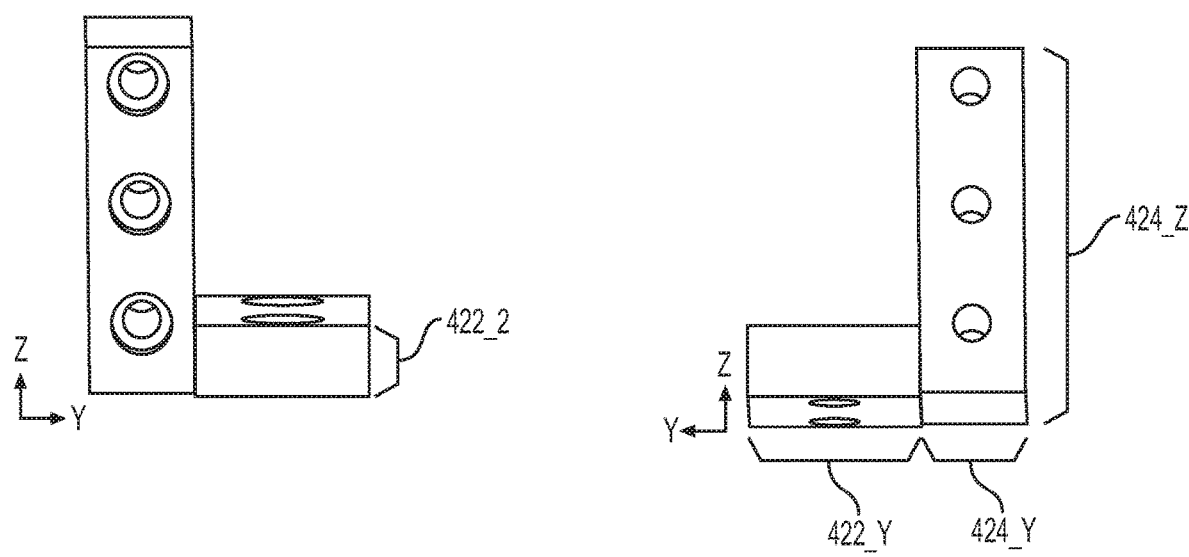

FIGS. 5A and 5B illustrates perspective views and side views of a horizontal coupling piece and a vertical coupling piece in a doser assembly according to an example embodiment.

Referring to FIGS. 1A, 1B, 5A and 5B, the doser assembly may include coupling pieces 400 for connecting the bracket assembly 300 to the vertical adjuster 440 and/or hopper assembly 200. The coupling pieces 400 may include a horizontal coupling piece 422 and a vertical coupling piece 424. Although not illustrated, more or fewer coupling pieces may be present in other embodiments.

The horizontal coupling piece 422 and the vertical coupling piece 424 may be joined together. For example, the horizontal coupling piece 422 and vertical coupling piece 424 may be screwed together, welded together, or joined together with an adhesive. Alternatively, in some embodiments, the horizontal coupling piece 422 and vertical coupling piece 424 may be combined into one solid coupling piece. In some embodiments, a bottom of the vertical coupling piece 424 may be secured to an upper surface of the horizontal piece 326. For example, although not illustrated, screws may extend through the horizontal piece 326 into holes in the bottom of the vertical coupling piece 424 to secure the vertical coupling piece 424 to the horizontal piece 326. In other embodiments, the bottom of the vertical coupling piece 424 may be welded to the upper surface of the horizontal piece 326, or joined using an adhesive.

The horizontal coupling piece 422 and vertical coupling piece 424 may be rectangular in shape, but are not limited to rectangular shapes. When the horizontal coupling piece 422 is rectangular, the horizontal coupling piece 422 may have a length 422_X in the X direction, width 422_Y in the Y direction, and a height 422_Z in the Z direction. The width 422_Y may be greater than that the height 422_Z and less than the length 422_X, but is not limited thereto. The horizontal coupling piece 422 may be arranged on the horizontal piece 326 of the bracket assembly 300 so the first coupling openings 422_O overlap the first coupling holes 326_O (see FIG. 4B) in the horizontal piece 326.

When the vertical coupling piece 424 is rectangular, the vertical coupling piece 424 may have length 424_X, width 424_Y, and a height 424_Z. The length 424_X may be greater than that the width 424_Y and less than the height 424_Z, but is not limited thereto. The vertical coupling piece 424 may include holes 424_O that extend through the coupling piece 424 from a first side surface 424_SS1 to a second side surface 424_SS2. A diameter of the holes 424_O may be different at the first side surface 424_SS1 and second side surface 424_SS2.

Figure 5C:
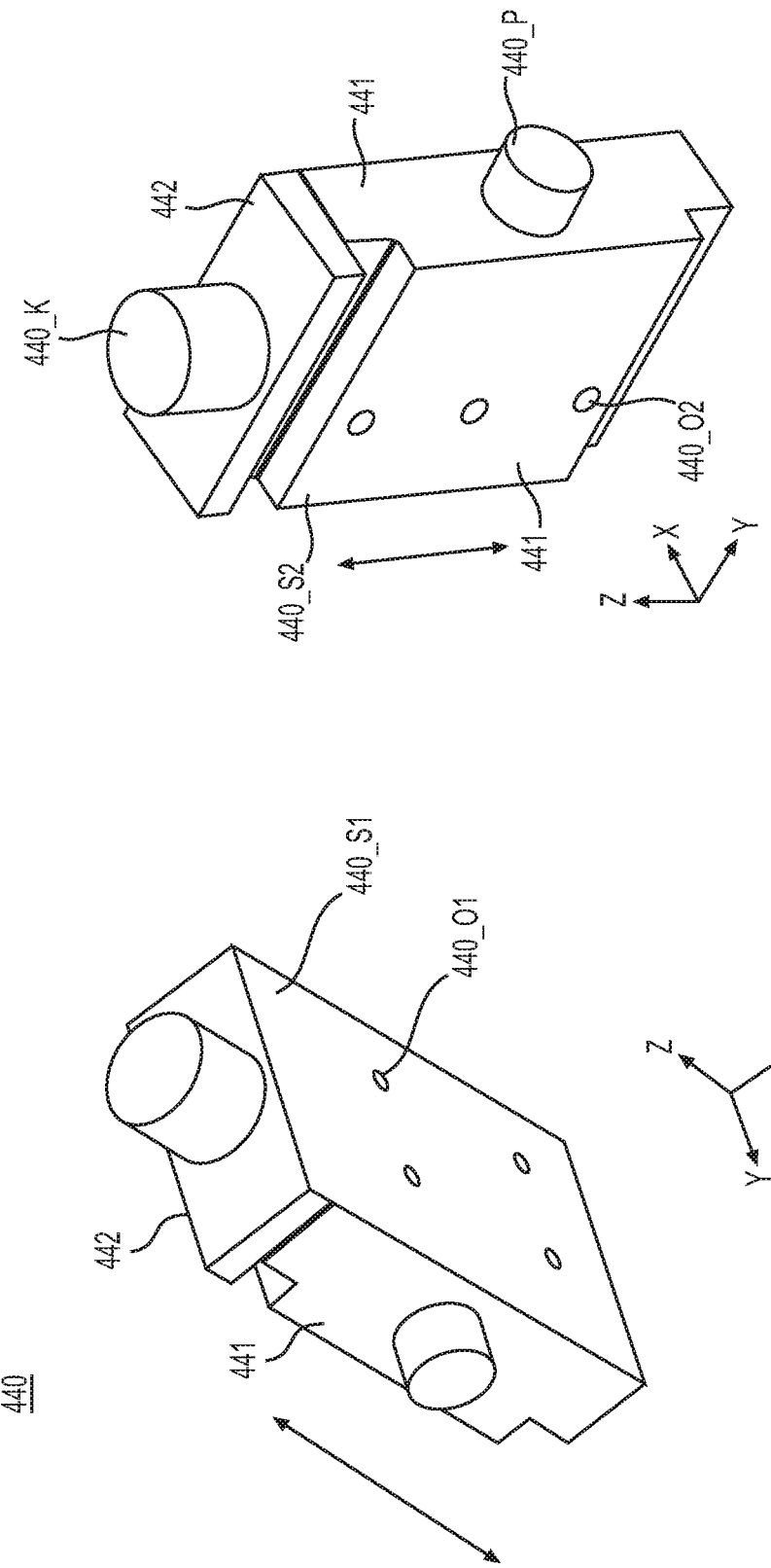
FIGS. 5C and 5D illustrate a perspective view and a photograph of a vertical adjuster in a doser assembly according to an example embodiment.
Figure 5D:
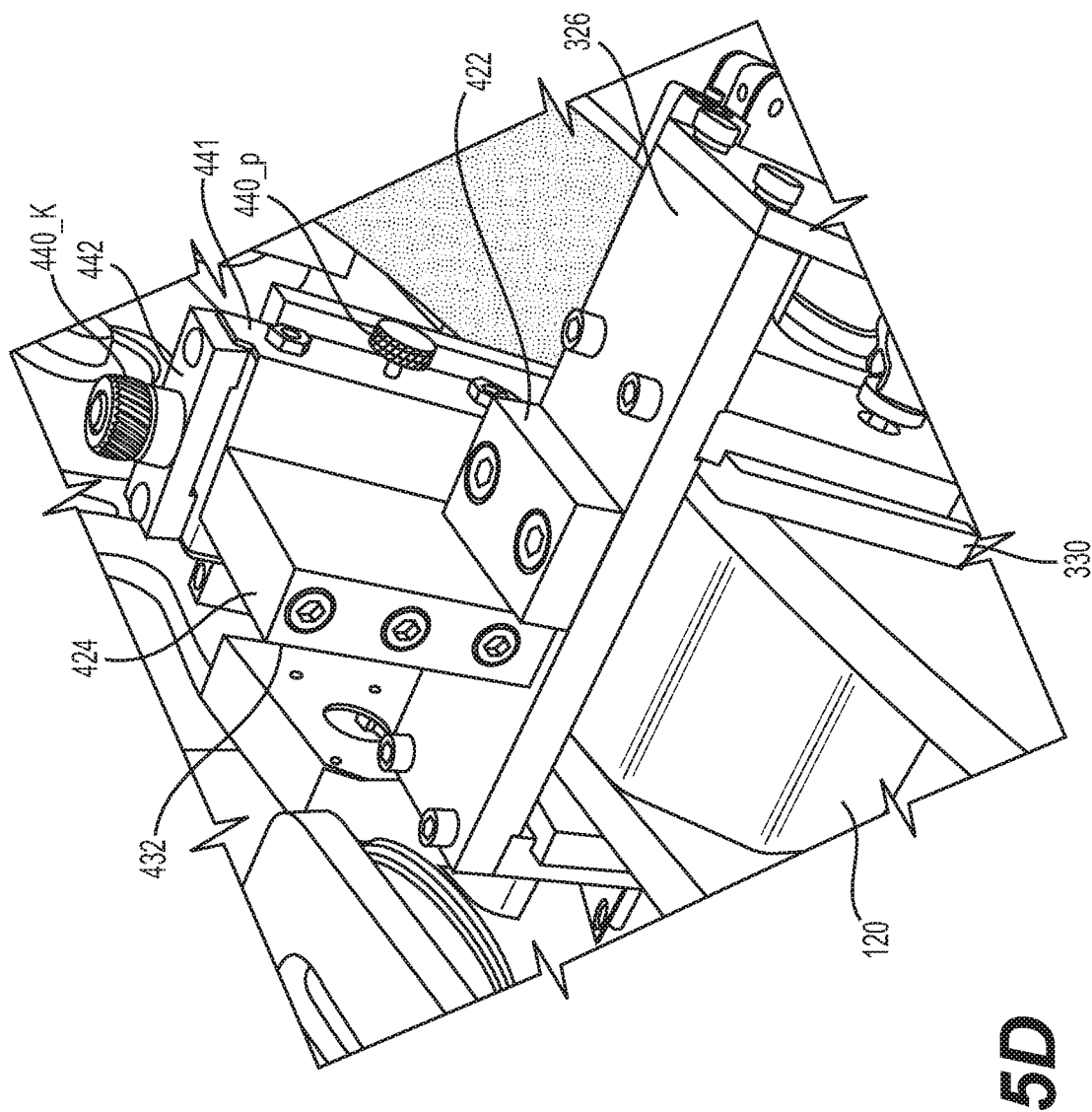

FIGS. 5C and 5D illustrate a perspective view and a photograph of a vertical adjuster in a doser assembly according to an example embodiment.

Referring to FIGS. 5C and 5D, in an embodiment, the vertical adjuster 440 may include an adjustable cover 441 that may be connected to a stationary body 442. The knob 440_K may be on a top surface of the stationary body 442 of the vertical adjuster 440. The adjuster pin 440_P may be at a side surface of the vertical adjuster 440. The adjuster pin 440_P may extend through an opening at a side of the adjustable cover 441. One surface 440_S1 of the vertical adjuster 440, for example a surface of the stationary body 442, may include openings 440_O1 for receiving the third screws 430.

The third screws 430 may connect the vertical adjuster 440 to the fourth hopper wall 220. Another surface 440_S2 of the vertical adjuster 440 may be opposite the first surface 440_S1 may include openings 440_O2 for receiving the fifth screws 432 used for connecting the vertical coupling piece 424 to the vertical adjuster 440. The adjustable cover 441 may include the surface 440_S2 of the vertical adjuster 440 and the adjustable cover 441 may define the openings 440_O2. The fifth screws 432 may extend through openings 440_O2 to connect the vertical coupling piece 432 to an internal structure (e.g., rack and pinion system) of the vertical adjuster 440 for varying the position in the Z direction of the vertical coupling piece 432 and adjustable cover 441. When the adjuster pin 440_P is withdrawn from the vertical adjuster 440, the vertical adjuster 440 may be used to adjust the position in the Z direction of the vertical coupling piece 432 and the adjustable cover 441 together by turning the knob 440_K. The adjuster pin 440_P may be used to fix the position in the Z direction of the adjustable cover 441 and vertical coupling piece 432 in place by inserting the adjuster pin 440_P through the adjustable cover 441 so the adjuster pin 440_P connects to the internal structure (e.g., rack and pinion system).

Figure 6:
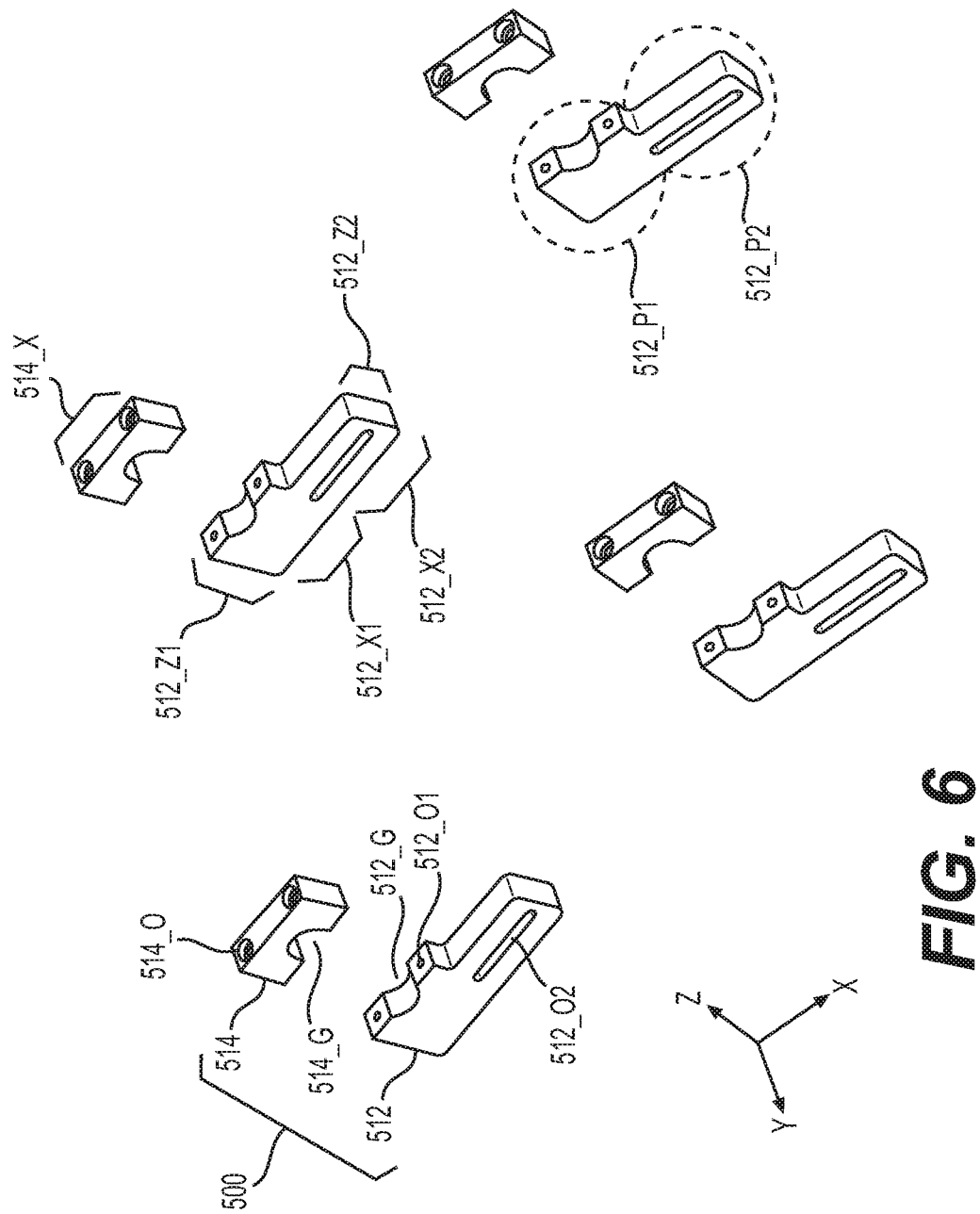
FIG. 6 is a perspective view of support structures in a doser assembly according to an example embodiment.

FIG. 6 is a perspective view of support structures in a doser assembly according to an example embodiment.

Referring to FIG. 6, each support structure 500 may include a lower portion 512 and an upper portion 514. The lower portion 512 may include a first partial portion 512_P1 and a second partial portion 512_P2, which may have the same width and length. A length 512_X1 of the first partial portion 512_P1 may be about the same as a length 514_X of the upper portion 514. A height 512_Z1 of the first partial portion 512_P1 may be greater than a height 512_Z2 of the second partial portion 512_P2. A length 512_X2 of the second partial portion 512_P2 may correspond to a difference between a length of the lower portion 512 and the length 512_X1 of the first partial portion 512_P1. The second partial portion 512_P2 may define a second lower portion opening 512_O2 that extends through a width of the second partial portion 512_P2. The second lower portion opening 512_O2 may have a length that extends to the first partial portion 512_P1.

An upper surface of the lower portion 512, at the first partial portion 512_P1, may define a lower support groove 512_G between a pair of first lower portion openings 512_O1. A lower surface of the upper portion 514 may define upper portion openings 514_O that extend through the upper portion 514 and are spaced apart from each other. The lower surface of the upper portion 514 may also define an upper support groove 514_G. When the upper portion 514 is placed on top of the first partial portion 512_P1, the upper portion openings 514_O and first lower portion openings 512_O1 may overlap each other. Also, when the upper portion 514 is placed on top of the first partial portion 512_P1, the lower support groove 512_G and upper support groove 514_G may combine to form the support structure opening 500_O (see FIG. 1G). As shown in FIG. 1K, sixth screws 530 may connect the lower and upper portions 512 and 514 of support structures 500 together through the upper portion openings 514_O and first lower portion openings 512_O1.

Figure 7A:
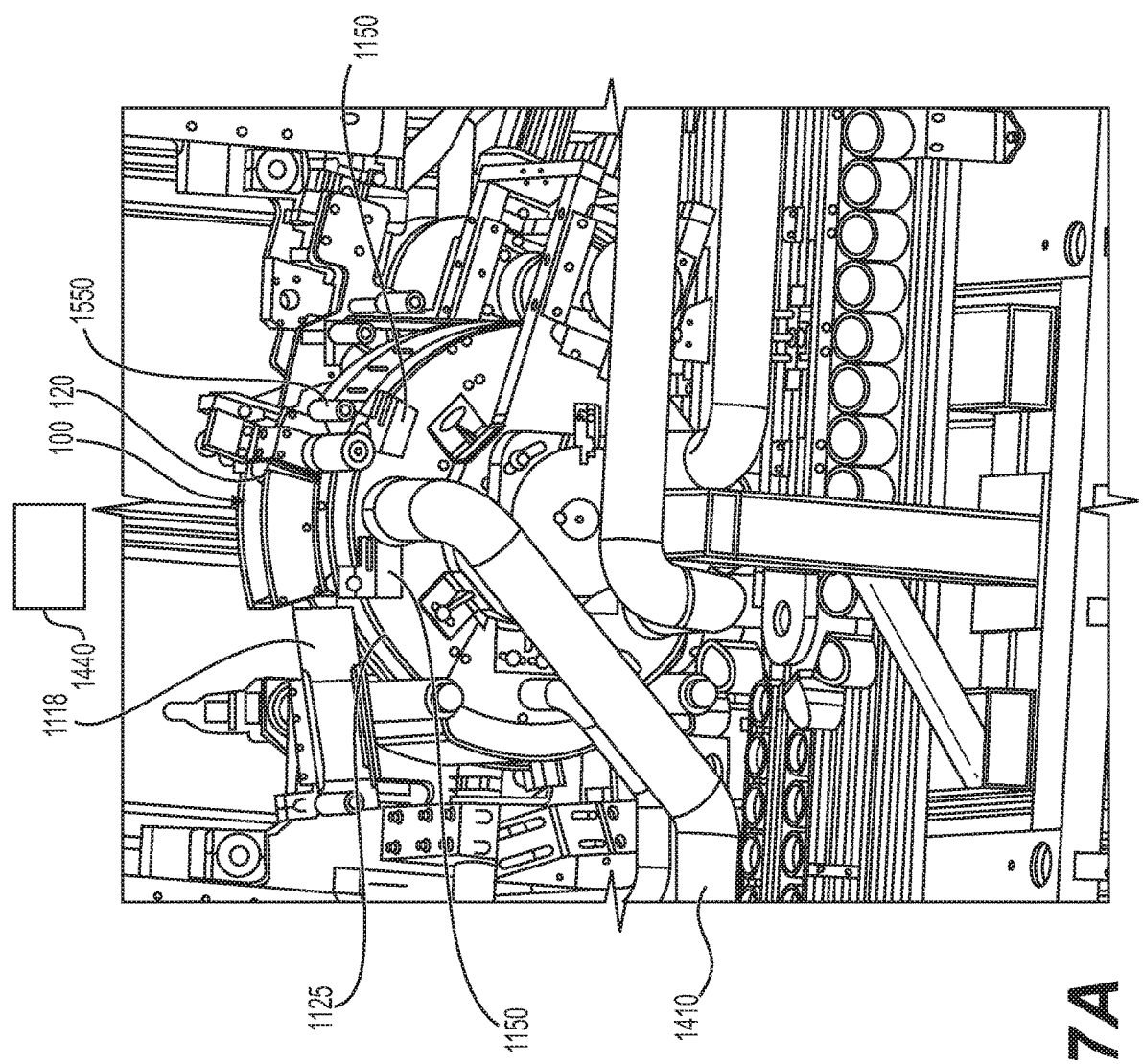
Figure 7B:
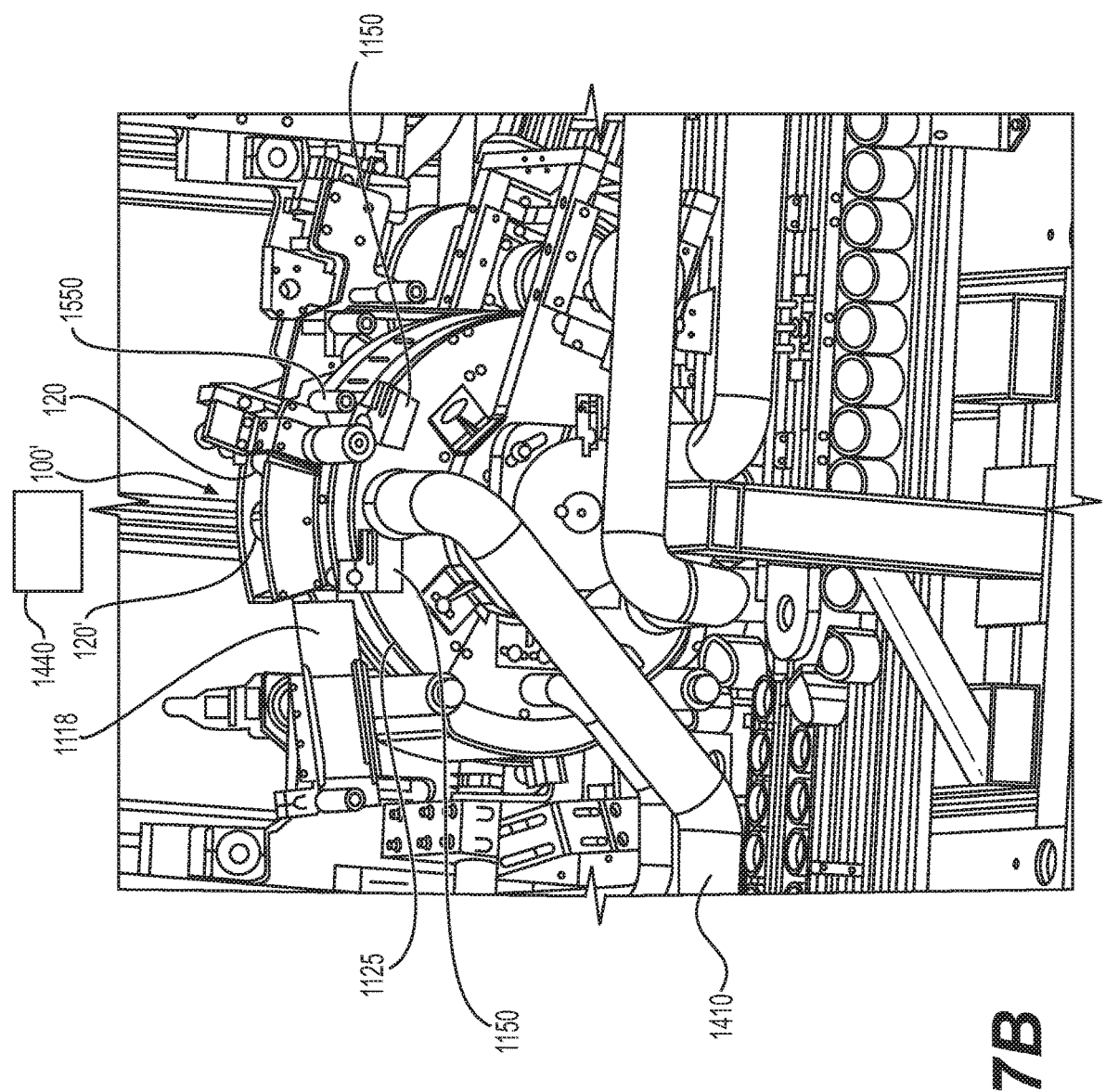
FIG. 7B is a side view of a portion of an apparatus including a doser assembly on a conveyor system according to an example embodiment.
Figure 7D:
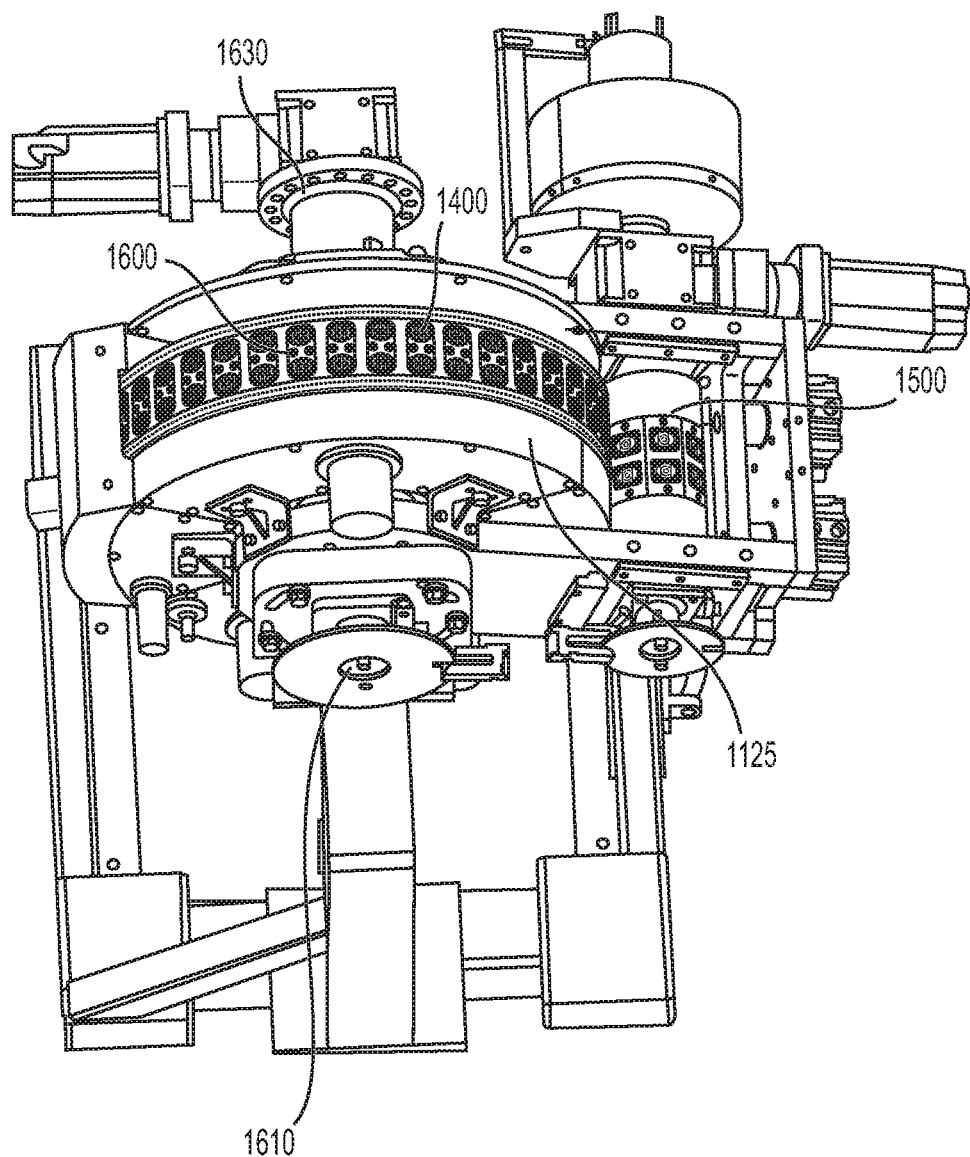
FIGS. 7D to 7F are partial views and a photograph showing a partial view of an example of a conveyor system according to an example embodiment.
Figure 7E:
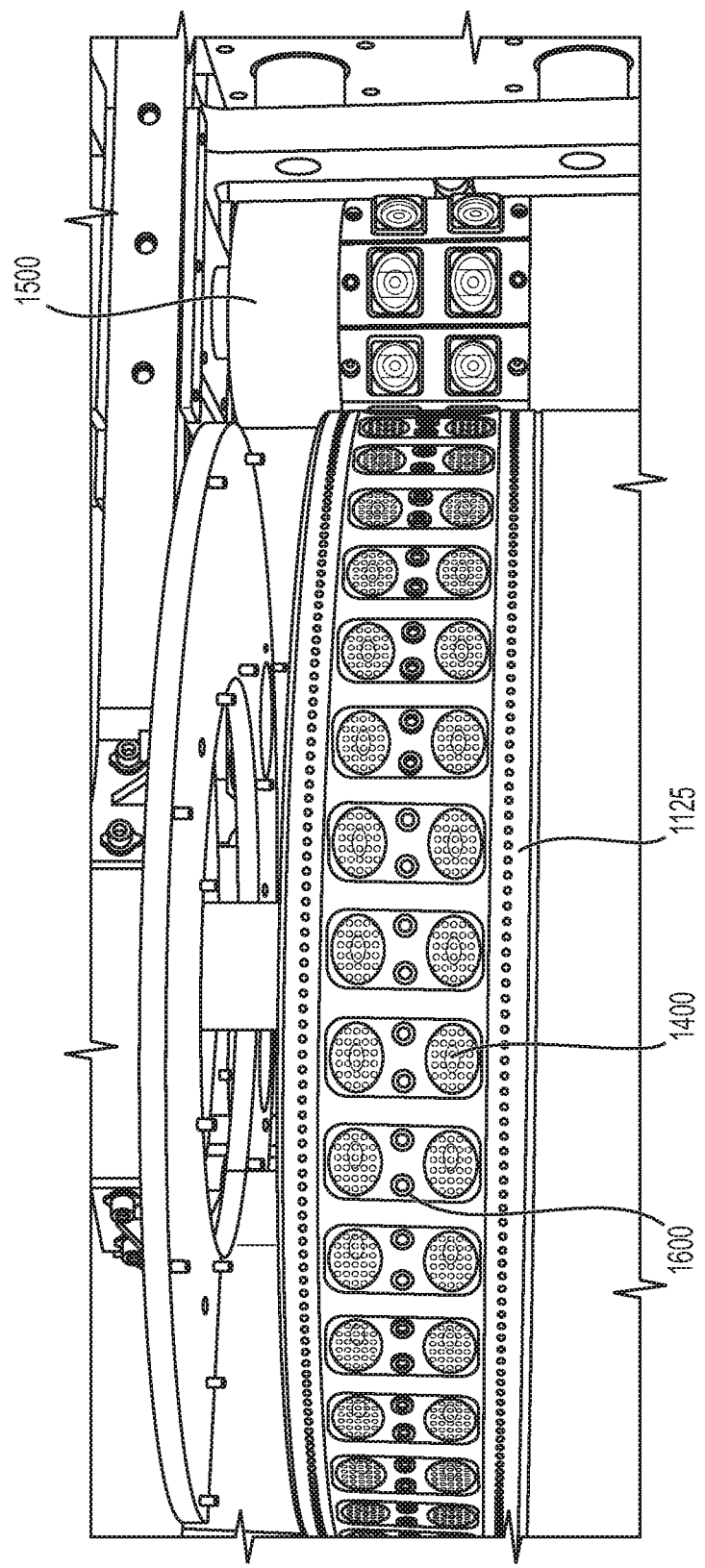
Figure 7F:
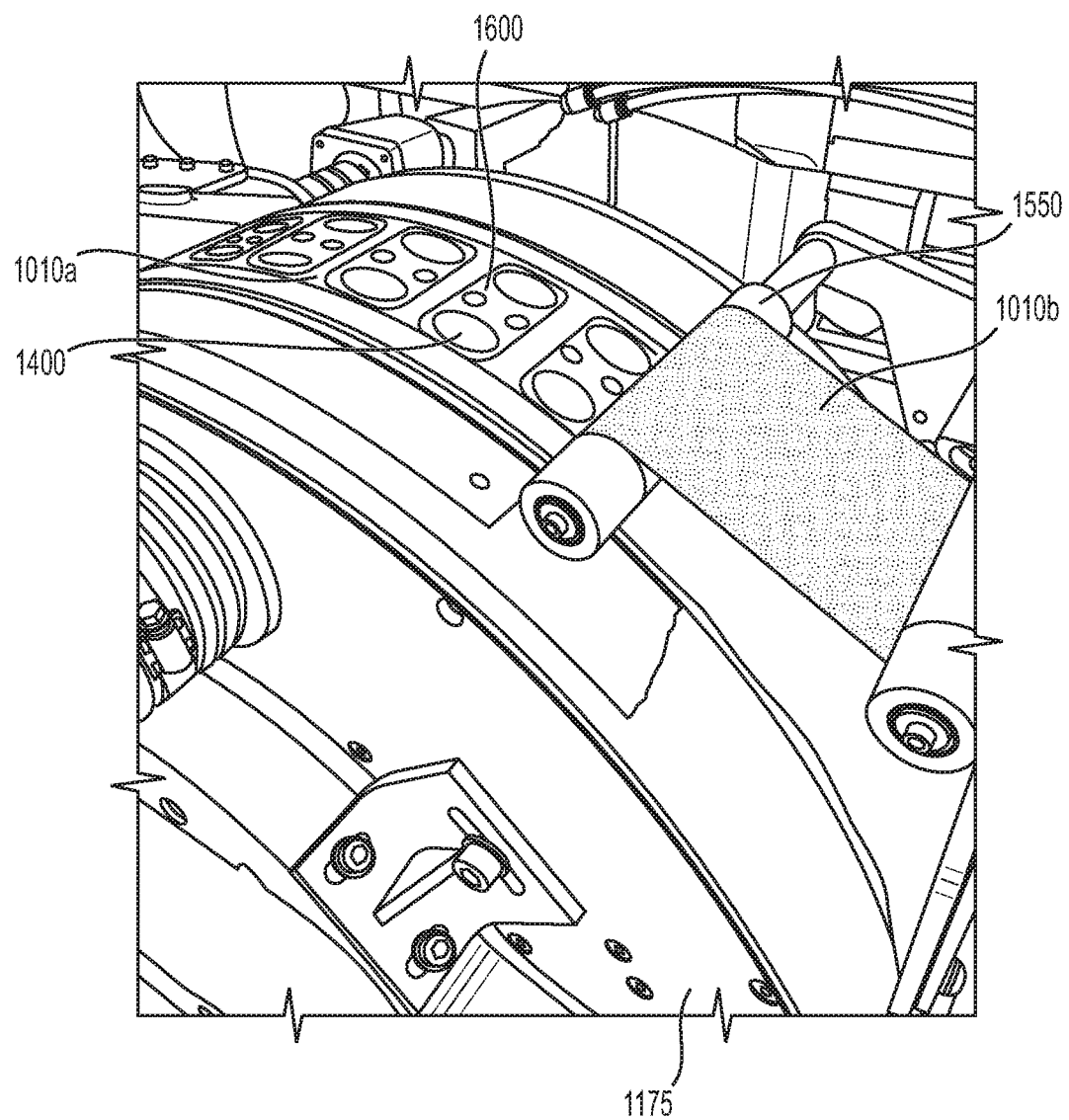

FIGS. 7A and 7C are a side view and a perspective view of portions of an apparatus including a doser assembly on a conveyor system according to an example embodiment. FIGS. 7D to 7F are partial views and a photograph showing a partial view of an example of a conveyor system according to an example embodiment.

Referring to FIGS. 1A, 1B, 7A and 7C, in an example embodiment, an apparatus may include the doser assembly 100 in FIGS. 1A and 1B placed on top of and/or over a conveyor system.

Additional details for non-limiting examples of the conveyor system, a doser, and/or an apparatus including the conveyor system and doser are described in co-pending U.S. application Ser. No. 16/382,820, titled "APPARATUSES AND METHODS FOR FORMING POUCH PRODUCT," the entire contents of each are incorporated herein by reference. The doser assembly 100 in FIGS. 1A and 1B (or doser assembly 100' described below with reference to FIG. 7B, may replace the doser 140 shown in FIG. 1 of co-pending U.S. application Ser. No. 16/382,820 titled "APPARATUSES AND METHODS FOR FORMING POUCH PRODUCT,".

Hereinafter, a non-limiting example where the doser assembly 100 in FIGS. 1A and 1B is placed on top of and/or over a conveyor system including a rotatable drum is described, but inventive concepts are not limited thereto.

Referring to FIGS. 1A, 1B, 7A, and 7C, the support structures 500 of the doser assembly 100 may be placed over the rotatable drum 1125. For example, the doser assembly 100 may be placed on one or more stationary structures 1150 adjacent to the rotatable drum 1150. The doser assembly 100 may be held in place by its own weight and/or may be secured to the stationary structure 1150 using fasteners (not shown). In some embodiments, the stationary structures 1150 may be attached to the housing of the rotatable drum 1125, where the housing may be stationary. In other embodiments, the stationary structures 1150 may be omitted and the doser assembly may be placed on top of the housing of the rotatable drum 1125. An example of the housing 1175 is shown in FIG. 7F.

A first stripper plate 1118 may abut the rotatable drum 1125 at a first receiving location of the rotatable drum 1125, adjacent to the doser assembly 100. The doser assembly 100 may be positioned over a dosing location of the rotatable drum 1125. A first holder (not shown) and a second holder 1550 may be positioned to provide first and second elastic layers to the rotatable drum 1125. The first holder (not shown) and second holder 1550 may be rollers on which the first elastic layer and the second elastic layers respectively are wrapped around. The first and second elastic layers 1010a and 1010b are illustrated in FIG. 7F and described later. The second holder 1550 may be adjacent to a second dosing location of the rotatable drum 1125. The dosing location of the rotatable drum 1125 may be a portion of the rotatable drum 1125 that is below a plant-material provider 1440 and between the first receiving location of the rotatable drum 1125 and the second receiving location of the rotatable drum 1125. The plant-material provider 1440 may be a machine (e.g., conveyor belt driven by a motor) for delivering plant material to the doser assembly 100. A vacuum source 1410 (e.g., conduit line connected to a vacuum pump) may be configured to supply vacuum to an inner portion of the rotatable rum 1125.

As shown in FIGS. 7D to 7F, the rotatable drum 1125 may include a plurality of plates 1600 spaced apart from each other along an outer periphery of the rotatable drum 1125. Each of the plates 1600 may define one or more divots 1400 (e.g., oval-shaped divots and/or other-shaped divots) to form lanes of the divots 1400 along the rotatable drum 1125. At least some or all of the divots 1400 may include a plurality of air inlets in fluid communication with the vacuum from the vacuum source 1410 shown in FIGS. 7A and 7B. The rotatable drum 1125 may be configured to rotate with the rotation of the rotary shaft 1610 shown in FIG. 7D. A motor 1630 may be configured to drive the rotary shaft 1610. A heat-knife assembly 1500 including a roller and a plurality of heat knives may be adjacent to the rotatable drum 1125.

As shown in FIG. 7F, a first elastic layer 1010a may be provided to cover the divots 1400 on a portion of the rotatable drum 1125. The vacuum from the vacuum source 1410 (shown in FIG. 7A) may pull the first elastic layer 1010a into the divots 1400 as the rotatable drum 1125 rotates. The first elastic layer 1010a may be dispensed from a first holder (not shown). The first holder (not shown) may be configured to rotate as the rotatable drum 1125 rotates such that the first holder provides the first elastic layer 1010a to the rotatable drum 1125. As the rotatable drum 1125 rotates, the first elastic layer 1010a may be moved from a location under the stripper plate 1118 over a top of the rotatable drum 1125, between the rotatable drum 1125 and doser assembly 100, and past the rotatable drum 1125 towards the heat-knife assembly 1500 shown in FIGS. 7D and 7E. The doser assembly 100 may be over the first elastic layer 1010a as the rotatable drum 1125 moves the first elastic layer 1010a over the top of the rotatable drum 1125.

Referring to FIGS. 7A, 7C and 7F, as the vacuum source 1410 pulls the first elastic layer 1010a into the divots 1400 while the rotatable drum 1125 rotates and moves the first elastic layer 1010a between the doser assembly 100 and the top of the rotatable drum 1125, plant material PM may be provided into the hopper opening 200_O (see FIG. 1A) of the doser assembly 100 onto the first elastic layer 1010a. The plant-material provider 1440 (see FIG. 7A) may provide the plant material PM into the hopper opening 200_O (see FIG. 1A) of the doser assembly 100. The plant material PM may fill the portions of the first elastic layer 1010a pulled into the divots 1400.

As the rotatable drum 1125 rotates, the first elastic layer 1010a and plates 1600 may move under the doser assembly 100 and the roller 120 may be rotated to push plant material PM into the divots 1400 and/or clear excess plant material PM from the divots 1400. Straight lateral edges on the roller, such as the lateral edges 120_LE in the example roller 120 described in FIG. 3A, may clear excess plant material PM so the plant material PM does not overfill the divots 1400. In other words, the roller 120 may clear the excess plant material PM from the divots, similar to how one uses a knife to level material (e.g., flour or sugar) in a measuring cup, so the height of the plant material PM in the divots 1400 may be equal to (or substantially equal to) the height of the divot filled by the plant material PM. Accordingly, the roller 120 may ensure the amount of plant material PM that fills the divots 1400 may be consistent from divot to divot 1400.

The vertical distance between the roller 120 and first elastic layer 1010a and pouching plate 1600 may be adjusted using the vertical adjuster 440 described in FIGS. 1A and 1B. Additionally, as the first elastic layer 1010a and plates 1600 move between under doser assembly 100 with the rotation of the rotatable drum 1125, sides of the hopper assembly 200 in the doser assembly 100, such as the walls 210 described in FIG. 3B, may limit and/or prevent plant material PM from spreading laterally off of the rotatable drum 1125. In other words, the hopper assembly portion of the doser assembly 100 may guide and/or contain the plant material PM so the plant material PM fills the divots 1400 and does not fall off of the rotatable drum 1125.

While FIGS. 7C to 7F illustrate a non-limiting example where the rotatable drum 1125 includes one lane of plates 1600 spaced apart from each other along the rotatable drum 1125, where each plate 1600 includes two divots 1400, example embodiments are not limited thereto. In some embodiments, a plurality of lanes of plates 1600 may be provided along the rotatable drum 1125 and/or the plates 1600 may include more or fewer than two divots 1400 per plate 1600.

Referring to FIGS. 7A, 7C, 7D, 7E, and 7F, as the rotatable drum 1125 rotates and the first elastic layer 1010a pulled into the divots 1400 is filled with plant material PM, the plant material PM and first elastic layer 1010a in the divots 1400 may move under the second holder 1550 shown in FIGS. 7A and 7F. The second holder 1550 may rotate in response to the rotation of the rotatable drum 1125 and provide a second elastic layer 1010b over the plant material PM and the first elastic layer 1010a in the divots 1400. Then, as the rotatable drum 1125 rotates, the plant material PM in the divots 1400 between the first elastic layer 1010a and the second elastic layer 1010b may move to the heat knife-assembly 1500 shown in FIGS. 7D and 7E. The heat knife assembly 1500 may include a plurality of heat knives configured to heat to a temperature (e.g., about 100° C. to about 500° C., but lower or higher temperatures may be used) sufficient to heat seal a portion of the first elastic layer 1010a to a portion of second elastic layer 1010b to form pouches including plant material PM. In the pouches, the plant material PM that fills the divots 1400 may be enclosed by the portion of the first elastic layer 1010a sealed to the portion of the second elastic layer 1010b.

The first elastic layer 1010a and the second elastic layer 1010b may be formed of the same materials or different materials. In some example embodiments, the first elastic layer 1010a and/or the second elastic layer 1010b may include a material that is the same as or similar to the elastomeric polymer pouch material set forth in U.S. Pat. No. 10,028,521 issued Jul. 24, 2018, the entire contents of which are incorporated herein by this reference thereto. Other suitable materials may also be used.

FIG. 7B is a side view of a portion of an apparatus including a doser assembly on a conveyor system according to an example embodiment.

Referring to FIG. 7B, the apparatus in FIG. 7B is the same as the apparatus described in reference to FIGS. 7A and 7C to 7F, except the doser assembly 100' may include a plurality of rollers instead of a single roller. The doser assembly 100' in FIG. 7B includes a first roller 120 and a second roller 120' spaced apart from each other. Although not illustrated, a motor may be connected to the second roller 120' and may be configured to rotate the second roller 120'. Also, a vertical adjuster may be connected to adjust the position of the second roller 120'. The first roller 120 and 120' may be adjusted to different vertical positions in the doser assembly 100'. For example, a lower surface of the first roller 120 may be lower than a lower surface of the second roller 120'. A difference in height between the lower surface of the first roller 120 and the lower surface of the second roller 120' may be about a half inch, but difference could be more or less than a half inch in some applications. A shape of the first roller 120 and a shape of the second roller 120' may be the same or different.

Rotational speeds of the rollers 120 and 120' in FIGS. 7A and 7B may be adjusted for desired performance. For example, the rotational speed of the rollers 120 and 120' may be increased to improve the ability of the rollers 120 and/or 120' to push plant material PM into the divots 1400 and/or clear excess plant material PM from the divots 1400. At the same time, the rotational speed of the rollers 120 and 120' may be reduced to limit and/or avoid damage to the first elastic layer 1010a.

FIG. 8 is a flow chart illustrating operations in a method of manufacturing a doser assembly according to an example embodiment.

Referring to FIGS. 1A, 1B, 3A, 3B, and 3C, and 8, in operation S810, the roller 120 may be positioned in the hopper opening 200_O of the hopper assembly 200. The hopper assembly 200 may be assembled by connecting the first and second hopper walls 210 to the third hopper wall 215 and the fourth hopper wall 220 using the first screws 217. Then, the base frame 230 and lateral extension members 240 may be connected to the first and second hopper walls 210. One or more conduit lines 250 may be inserted in corresponding conduit openings 200_CO in the hopper assembly 200. When positioning the roller 120 into the hopper opening 200_O, the roller openings 120_RO may be aligned with the first and second hopper grooves 210_G so a length of the roller 120 extends between the first and second parts 200_P1 and 200_P2 of the interior surface of the hopper assembly 200. In some example embodiments, the doser assembly may include a plurality of rollers. For example, the doser assembly 100' in FIG. 7B includes the roller 120 and another roller 120'. Accordingly, according to some example embodiments, operation S810 may further include positioning one or more additional rollers in the hopper opening 200_O of the hopper assembly 200 and aligning the one or more additional rollers with additional grooves (not shown) in the hopper assembly 200.

Referring to FIGS. 1A, 1B, 1F, 1I, 5C, and 8, in operation S820, the vertical adjuster 440 may be connected to the hopper assembly 200. For example, the third screws 430 may be inserted through the first holes 220_h1 of the fourth hopper wall 220 into the first adjuster openings 440_1 of the vertical adjuster 440.

Referring to FIGS. 1A, 1B, and 8, in operation S830, the support structures 500 may be connected to the hopper assembly 200. As shown in FIGS. 1A, 1F, 1G, 3B, and 6, the support structures 500 may be connected to the hopper assembly 200 using the second screws 520. The second screws 520 may extend through corresponding support structure opening 500_O and corresponding openings in the base frames 230.

Referring to FIGS. 1A, 1B, 1L, 3A, and 8, in operation S840, the bracket assembly 300 may be connected to the vertical adjuster 440 and/or roller 120. The horizontal piece 326 of the bracket assembly 300 may be placed over the hopper assembly 200 and the shaft 318 of the bracket may be inserted into the roller 120 through the hopper grooves 210_G and roller opening 120_RO.

The coupling pieces 400 may connect the bracket assembly 300 to the vertical adjuster 440. For example, as shown in FIGS. 1J, 4B, and 5A, fourth screws 434 may connect the horizontal coupling piece 422 to the horizontal piece 326 of the bracket assembly 300 through first coupling openings 422_O in the horizontal coupling piece 422 and first coupling holes 326_O in the horizontal piece 326 of the bracket assembly 300. As shown in FIGS. 1H, 4B, and 5A, fifth screws 432 may connect the vertical coupling piece 424 to the vertical adjuster 440 through corresponding holes 424_O in the vertical coupling piece 424 and corresponding openings 440_O2 in the vertical adjuster 440.

If the doser assembly includes more than one roller like the doser assembly 100' in FIG. 7B including the rollers 120' and 120, then each roller may be connected to a separate bracket assembly. Also, each bracket assembly may be connected to a separate vertical adjuster and the separate vertical adjusters may be connected to separate parts of the hopper assembly.

Referring to FIG. 8, in operation S850, position adjustments may be made to structures of the doser assembly. For example, referring to FIG. 1B, the vertical adjuster 440 may be used to adjust a position in the Z direction of the roller 120 and bracket assembly 300. The support structures 500 may be rotated to prepare the doser assembly for placement on an underlying structure, such as the rotatable drum 1125 described in FIGS. 7A and 7B.

Although FIG. 8 illustrates an example method of making the doser assembly 100 in FIGS. 1A and 1B, one of ordinary skill in the art would appreciate that the method may be modified in various ways. For example, without limitation, the order of performing operations S810 to S840 may change, or some portions of the example operations may be omitted and/or performed during other operations.

While some example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:
1. A doser assembly comprising:
a hopper assembly configured to receive plant material,
an interior surface of the hopper assembly defining a hopper opening that extends through the hopper assembly;

a bracket assembly connected to the hopper assembly, the bracket assembly including a shaft that extends across a portion of the hopper opening;
a roller in a portion of the hopper opening of the hopper assembly, the roller extending in a direction between a first part of the interior surface of the hopper assembly and a second part of the interior surface of the hopper assembly, the roller connected to the shaft of the bracket assembly, and the roller being configured to rotate with a rotation of the shaft of the bracket assembly; and
a vertical adjuster connected to the bracket assembly, the vertical adjuster being configured to adjust a position of the roller, wherein
an upper surface of the hopper assembly defines a first hopper groove and a second hopper groove that are spaced apart from each other and descend from the upper surface of the hopper assembly,
the shaft is connected to the roller and extends through the first hopper groove, the roller, and the second hopper groove, and
the vertical adjuster is configured to adjust the position of the roller based on adjusting the position of the shaft.

2. The doser assembly of claim 1, wherein
the first hopper groove and the second hopper groove each have a width in a first direction, are spaced apart from each other in a second direction, and each descend in a third direction from the upper surface of the hopper assembly;
the first direction, second direction, and third direction cross each other;
the shaft extends in the second direction through the first hopper groove, the roller, and the second hopper groove; and
the vertical adjuster is configured to adjust the position of the roller in the third direction based on adjusting the position of the shaft in the third direction.

3. The doser assembly of claim 1, wherein
a lower surface of a first side of the hopper assembly is concave;
a lower surface of a second side of the hopper assembly is concave;
the first side of the hopper assembly and the second side of the hopper assembly each extend in a first direction and are spaced apart from each other in a second direction crossing the first direction;
an inner surface of the first side of the hopper assembly includes the first part of the interior surface of the hopper assembly; and
an inner surface of the second side of the hopper assembly includes the second part of the interior surface of the hopper assembly.

4. The doser assembly of claim 1, wherein
the hopper assembly includes a first hopper wall and a second hopper wall that face each other and are spaced apart from each other;
an inner surface of the first hopper wall includes the first part of the interior surface of the hopper assembly; and
an inner surface of the second hopper wall includes the second part of the interior surface of the hopper assembly.

5. The doser assembly of claim 4, wherein
a lower surface of the first hopper wall is concave;
a lower surface of the second hopper wall is concave; and
the lower surface of the first hopper wall is level with the lower surface of the second hopper wall and aligned with the lower surface of the second hopper wall.

6. The doser assembly of claim 5, wherein
the first hopper wall includes the first hopper groove and the first hopper groove descends from an upper surface of the first hopper wall;
the second hopper wall includes the second hopper groove and the second hopper groove descends from an upper surface of the second hopper wall;
the second hopper groove is positioned across from the first hopper groove;
a depth of the first hopper groove is less than a distance between the lower surface of the first hopper wall and the upper surface of the first hopper wall at a location adjacent to the first hopper groove; and
a depth of the second hopper groove is less than a distance between the lower surface of the second hopper wall and the upper surface of the second hopper wall at a location adjacent to the second hopper groove.

7. The doser assembly of claim 6, wherein
the roller is between the first hopper groove and the second hopper groove;
the shaft extends through the first hopper groove and the second hopper groove;
the depth of the first hopper groove is equal to the depth of the second hopper groove;
a width of the first hopper groove is equal to a width of the second hopper groove; and
the width of the first hopper groove and the width of the second hopper groove are greater than or equal to a width of the shaft.

8. The doser assembly of claim 7, wherein
the hopper assembly further includes a third hopper wall and a fourth hopper wall that face each other;
the third hopper wall and the fourth hopper wall are spaced apart from each other;
the third hopper wall is connected to the first hopper wall and the second hopper wall at a first end region of the hopper assembly; and
the fourth hopper wall is connected to the first hopper wall and the second hopper wall at a second end region of the hopper assembly.

9. The doser assembly of claim 8, wherein
the interior surface of the hopper assembly that defines the hopper opening includes at least a portion of the inner surface of the first hopper wall, at least a portion of the inner surface of the second hopper wall, at least a portion of an inner surface of the third hopper wall and at least a portion of an inner surface of the fourth hopper wall; and
the roller is adjacent to the inner surface of the fourth hopper wall in hopper opening.

10. The doser assembly of claim 1, wherein
the bracket assembly further includes a motor connected to one end of the shaft; and
the motor is configured to rotate the shaft.

11. The doser assembly of claim 1, further comprising:
a first conduit line configured to provide vacuum, gases, or both vacuum and gases into the hopper assembly through a first conduit opening in the hopper assembly; and optionally
a second conduit line configured to provide vacuum, gases, or both vacuum and gases into the hopper assembly through a second conduit opening in the hopper assembly.

12. The doser assembly of claim 1, wherein
the roller has a width in a first direction;
a length of the roller extends in a second direction that crosses the first direction; and the vertical adjuster is configured to adjust a position of at least a portion of the bracket assembly in a third direction that crosses the first direction and the second direction.

13. The doser assembly of claim 12, wherein
the vertical adjuster includes a knob;
the first hopper groove and the second hopper groove are spaced apart from each other in the second direction;
the shaft extends in the second direction through the first hopper groove and the second hopper groove; and
the vertical adjuster is configured to adjust the position of the shaft of the bracket assembly in the third direction in response to the knob being rotated.

14. The doser assembly of claim 13, wherein
the bracket assembly includes a horizontal piece;
the horizontal piece of the bracket assembly extends in the second direction over the roller, the portion of the hopper opening, and a region of the hopper assembly that includes the first part of the interior surface of the hopper assembly and the second part of the interior surface of the hopper assembly; and
a length of the horizontal piece in the second direction is greater than a width of the hopper assembly in the second direction.

15. The doser assembly of claim 14, wherein
the bracket assembly further includes a first bracket wall, a second bracket wall, a third bracket wall, a first spacer structure, and a second spacer structure;
the first bracket wall, the second bracket wall, and the third bracket wall are spaced apart from each other in the second direction and connected to the horizontal piece;
the shaft extends in the second direction through corresponding holes in the first bracket wall the second bracket wall and the third bracket wall;
the first spacer structure is wedged between the second bracket wall and an outer surface of a first side of the hopper assembly;
the shaft extends through a first shaft opening defined in the first spacer structure and a second shaft opening defined in the second spacer structure;
the second spacer structure is wedged between the third bracket wall and a second side of the hopper assembly;
the vertical adjuster is configured to adjust a position of the horizontal piece, the first bracket wall, the second bracket wall, and the third bracket wall in the third direction in response to the knob being rotated; and
the vertical adjuster is configured to adjust the position of the second bracket wall and third bracket wall in the third direction relative to the first spacer structure and the second spacer structure in the third direction in response to the knob being rotated.

16. The doser assembly of claim 12, wherein
the hopper assembly includes a first hopper wall and second hopper wall that extend in the first direction and are spaced apart from each other in the second direction;
the first hopper wall defines the first hopper groove;
the second hopper wall defines the second hopper groove;
a lower surface of the roller is higher in the third direction than a lower surface of the first hopper wall and a lower surface of the second hopper wall by a roller offset distance;
the roller offset distance is greater than 0 inches and less than ⅛ of an inch;

the shaft extends through a center of the roller in the second direction, the shaft is connected to the roller; and
the vertical adjuster is configured to adjust the roller offset distance in the third direction based on adjusting the position of the shaft in the third direction.

17. The doser assembly of claim 1, wherein
the roller has a prism-like shape;
the roller includes a first roller base and a second roller base connected to each other with a plurality of lateral faces therebetween; and
a shape of the first roller base is the same as a shape of the second roller base.

18. A doser assembly comprising:
a hopper assembly configured to receive plant material,
an interior surface of the hopper assembly defining a hopper opening that extends through the hopper assembly;
a bracket assembly connected to the hopper assembly, the bracket assembly including a shaft that extends across a portion of the hopper opening;
a roller in a portion of the hopper opening of the hopper assembly, the roller extending in a direction between a first part of the interior surface of the hopper assembly and a second part of the interior surface of the hopper assembly, the roller connected to the shaft of the bracket assembly, and the roller being configured to rotate with a rotation of the shaft of the bracket assembly, wherein
the roller has a prism-like shape;
the roller includes a first roller base and a second roller base connected to each other with a plurality of lateral faces therebetween; and
a shape of the first roller base is the same as a shape of the second roller base.

19. The doser assembly of claim 18, wherein
the shape of the first roller base and the shape of the second roller base are regular polygons that include at least N sides;
N is an integer greater than or equal to four and less than or equal to twelve;
the roller has a shape like a regular polygonal prism including at least N lateral faces;
a length of the N lateral faces is a length of the roller; and
a width of the N lateral faces is a width of an edge of the first roller base and a width of an edge of the second roller base.

20. The doser assembly of claim 18, wherein
the first roller base includes a first recess that defines a first roller protrusion that extends from a center of the first roller base and is surrounded by the first recess;
the second roller base includes a second recess that defines a second roller protrusion that extends from a center of the second roller base and is surrounded by the second recess;
the roller defines a roller opening that extends from the first roller protrusion through the roller to the second roller protrusion;
the shaft of the bracket assembly extends through the roller opening, and
the shaft is connected to roller such that the roller is configured to rotate with the rotation of the shaft.

21. A method of manufacturing a doser assembly, the method comprising:
positioning a roller in a hopper assembly configured to receive plant material, an interior surface of the hopper assembly defining a hopper opening that extends through the hopper assembly, the roller including a roller opening that extends through a length of the roller, the hopper assembly defining a first hopper groove and a second hopper groove that descend from an upper surface of the hopper assembly and are spaced apart from each other across a portion of the hopper opening, the positioning the roller in the hopper assembly including arranging the roller in the portion of the hopper opening so the roller extends in a direction between a first part of the interior surface of the hopper assembly and a second part of the interior surface of the hopper assembly; and connecting a bracket assembly to the hopper assembly, the bracket assembly including a shaft, the connecting the bracket assembly to the hopper assembly including inserting the shaft through the first hopper groove, the roller opening, and the second hopper groove, and the connecting the bracket assembly to the hopper assembly including connecting the shaft to the roller such that the roller is configured to rotate with a rotation of the shaft.

22. The method of claim 21, further comprising connecting a vertical adjuster to the hopper assembly and bracket assembly, wherein the roller has a width in a first direction, a length of the roller extends in a second direction, the second direction crosses the first direction, a length of the shaft extends in the second direction, the vertical adjuster is configured to adjust a position of the shaft in a third direction that crosses the first direction and the second direction, and the vertical adjuster is configured to adjust a position of the roller in the third direction based on adjusting the position of the shaft in the third direction.

* * * * *